| CONTROL WIRES | DRIVING POWER | | | | | | | | |
|---|---|---|---|---|---|---|---|---|---|
| | IDLE | NO.1 | NO.2 | NO.3 | NO.4 | NO.5 | NO.6 | NO.7 | NO.8 |
| PY | X | | | | | | | | |
| EX | | X | X | X | X | X | X | X | X |
| AV | | | X | | X | | X | | X |
| BV | | | | | | X | X | X | X |
| CV | | | | X | X | X | X | X | X |
| DV | | | | | | X | X | | |

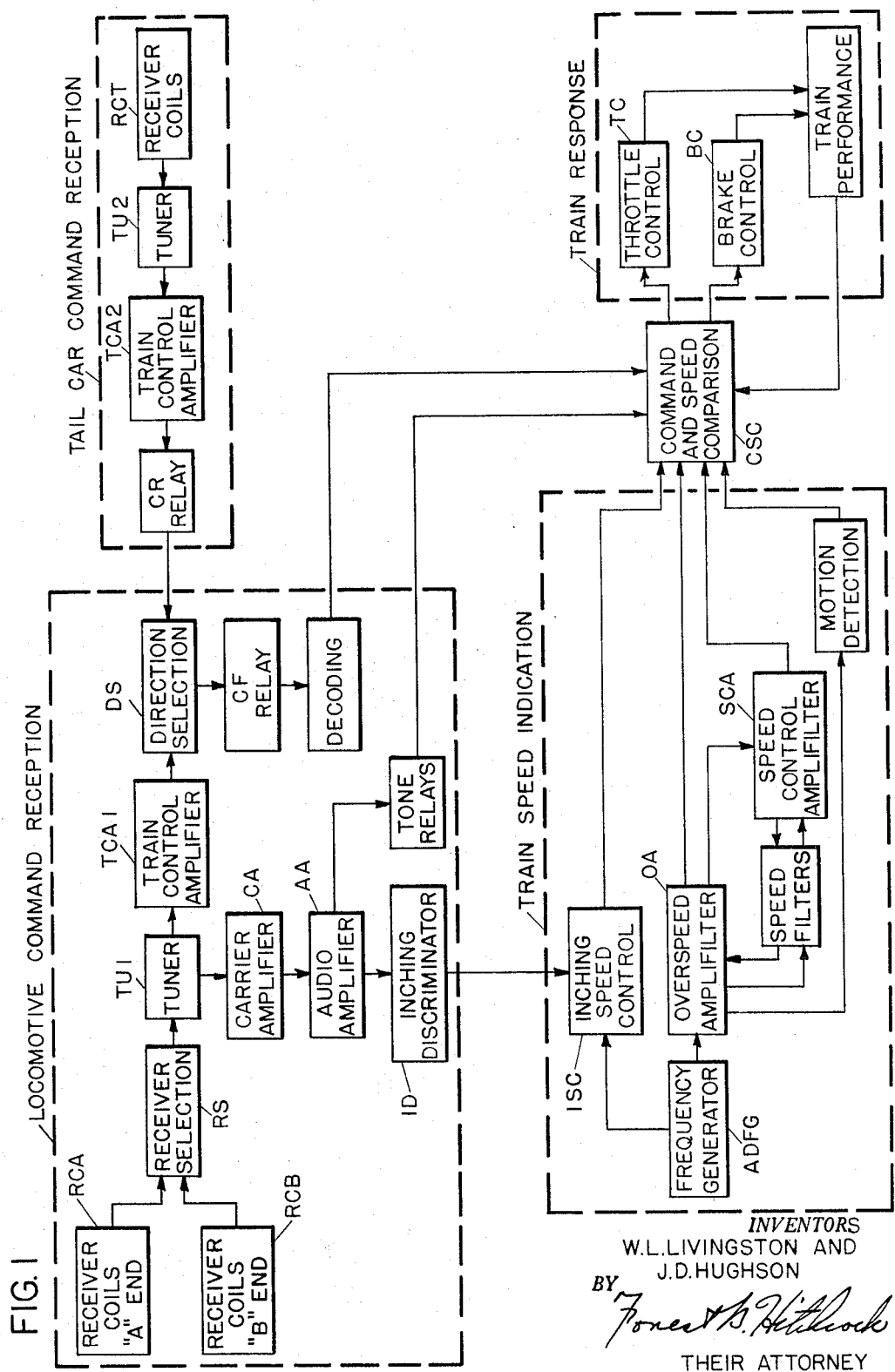

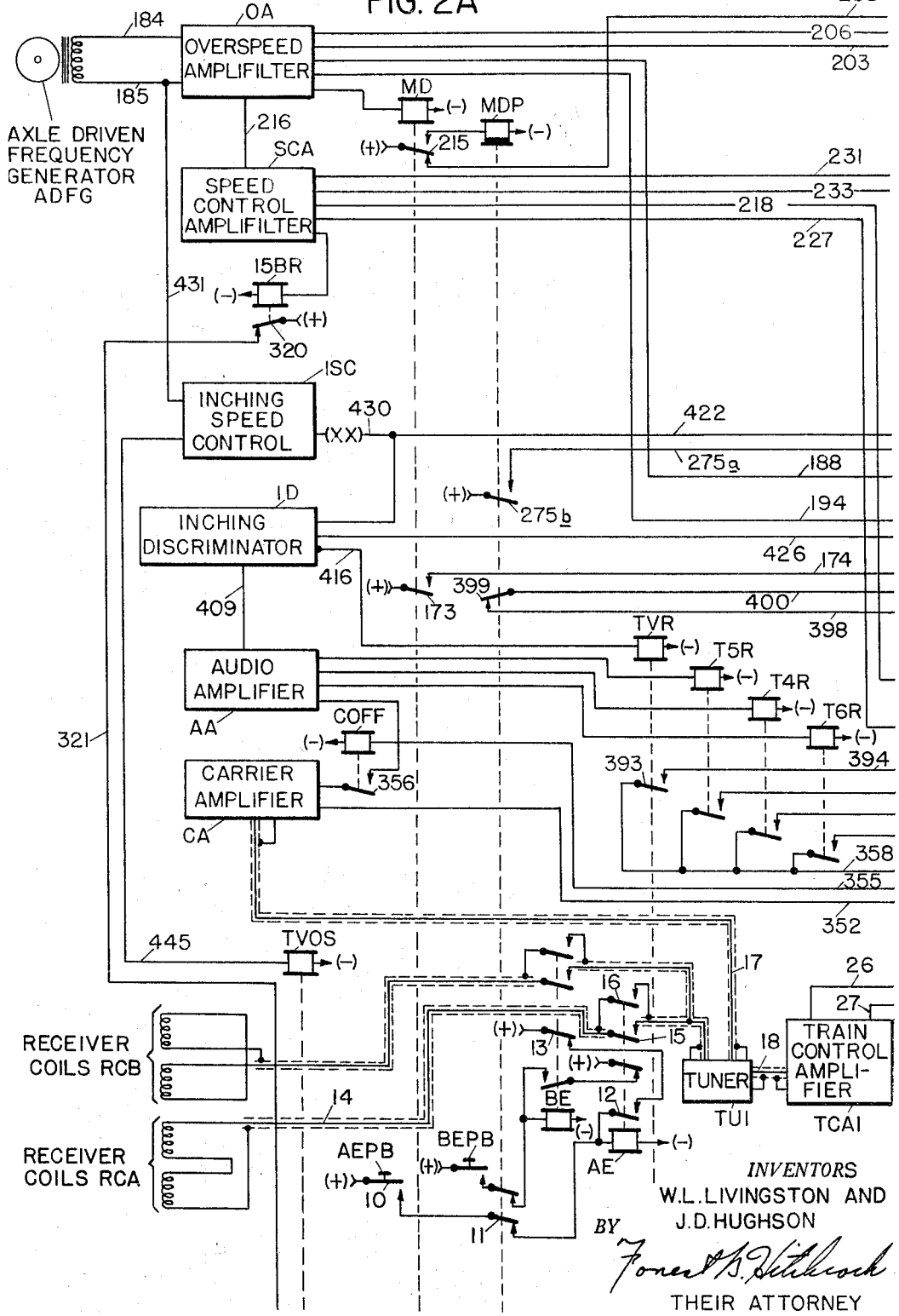

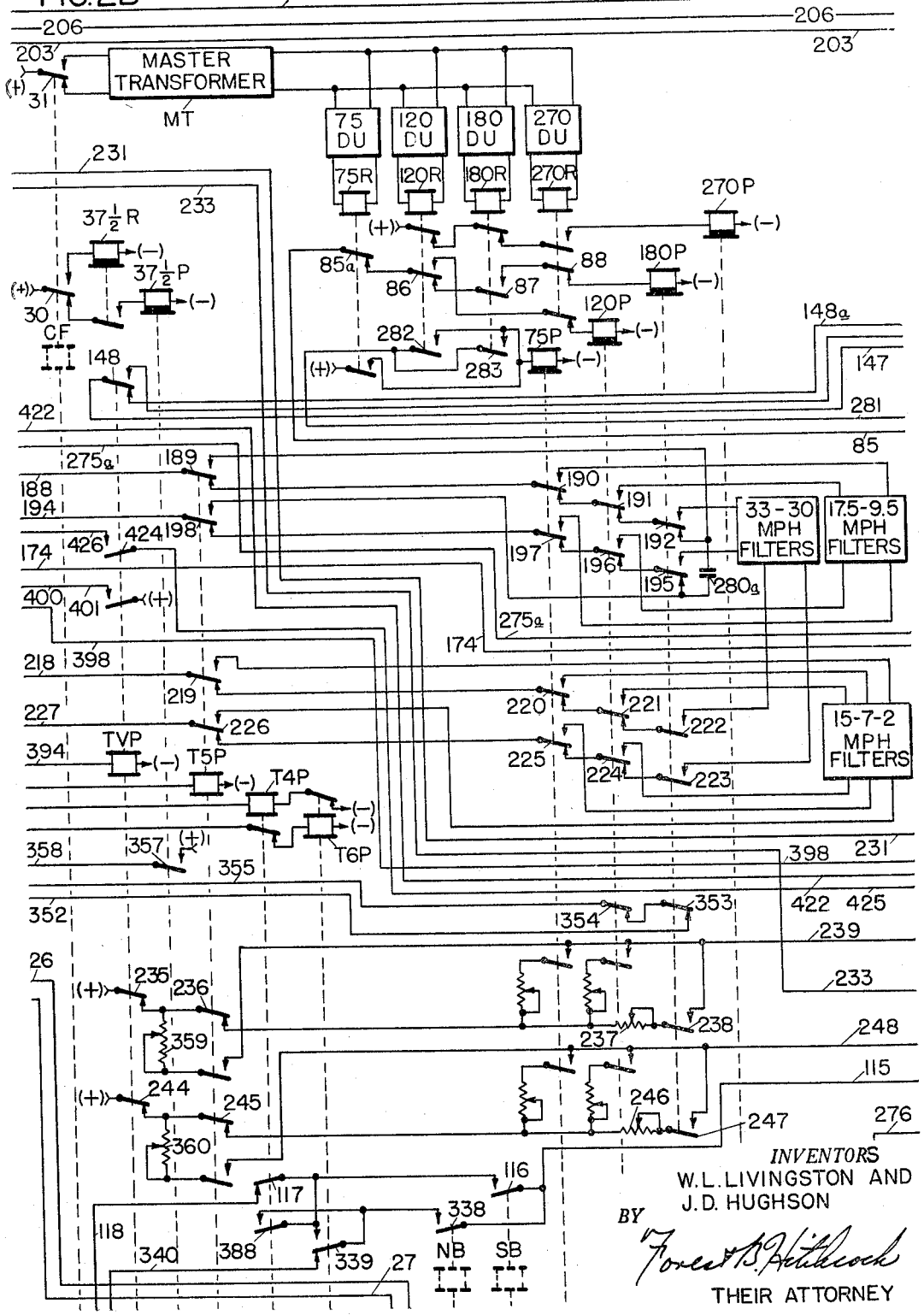

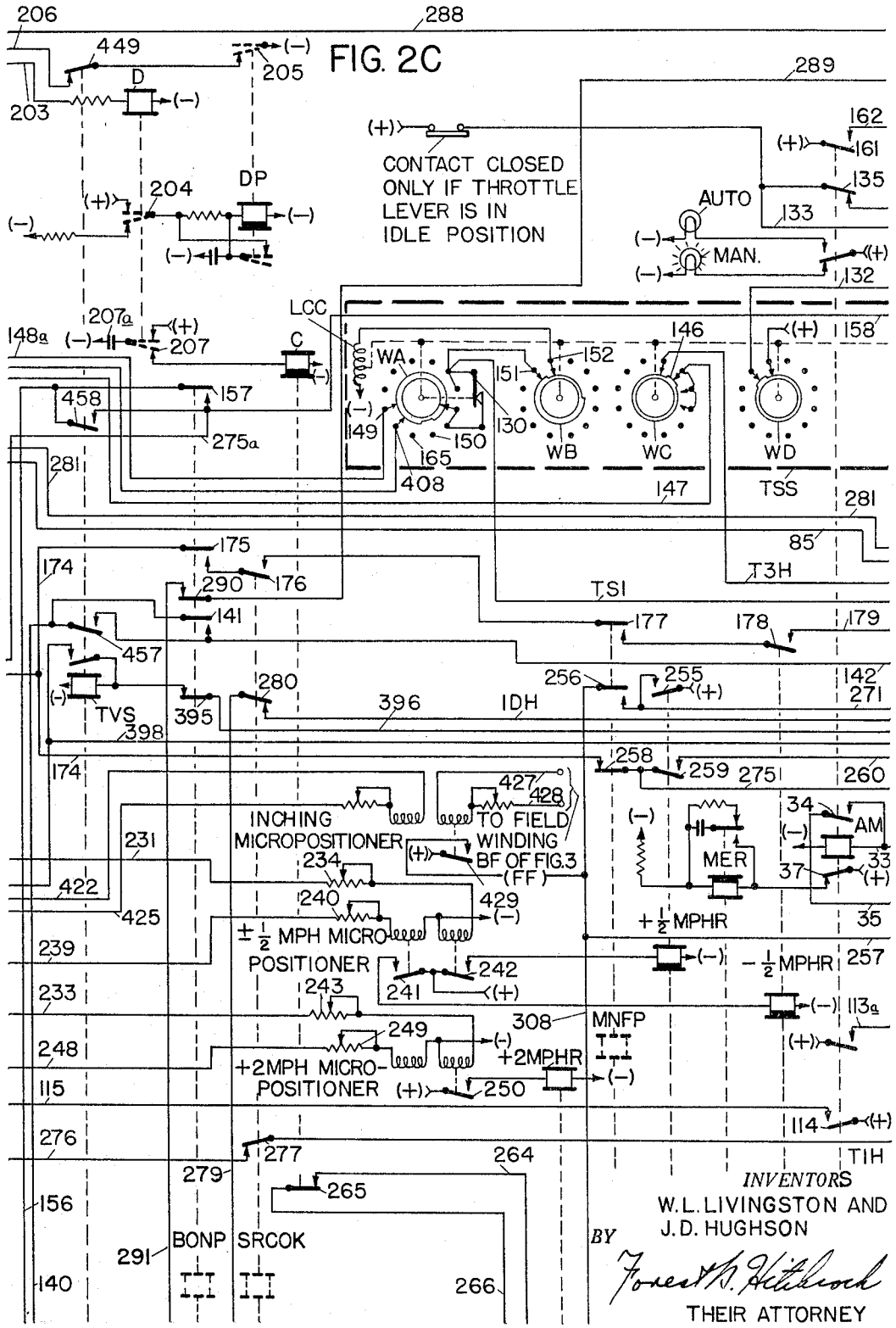

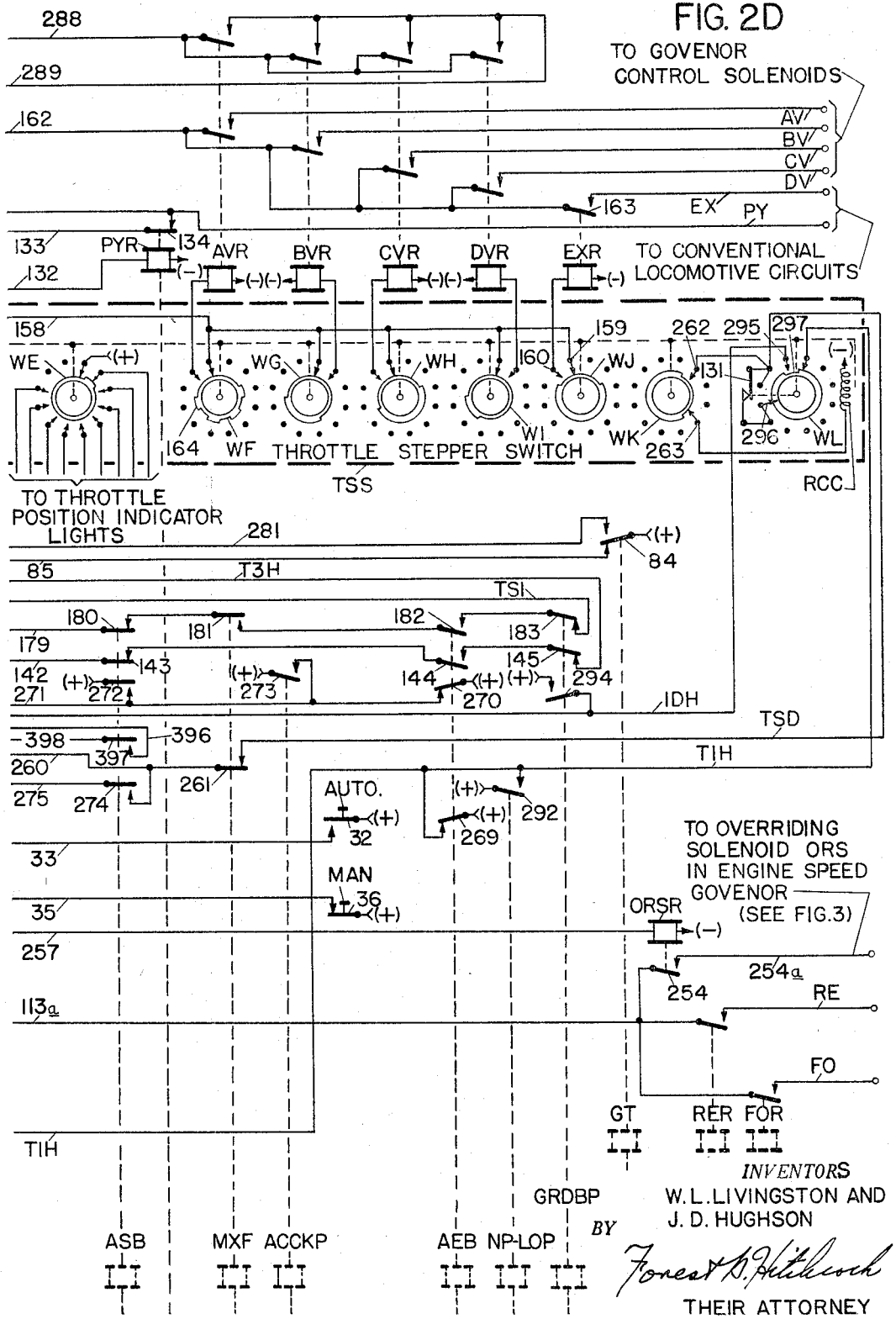

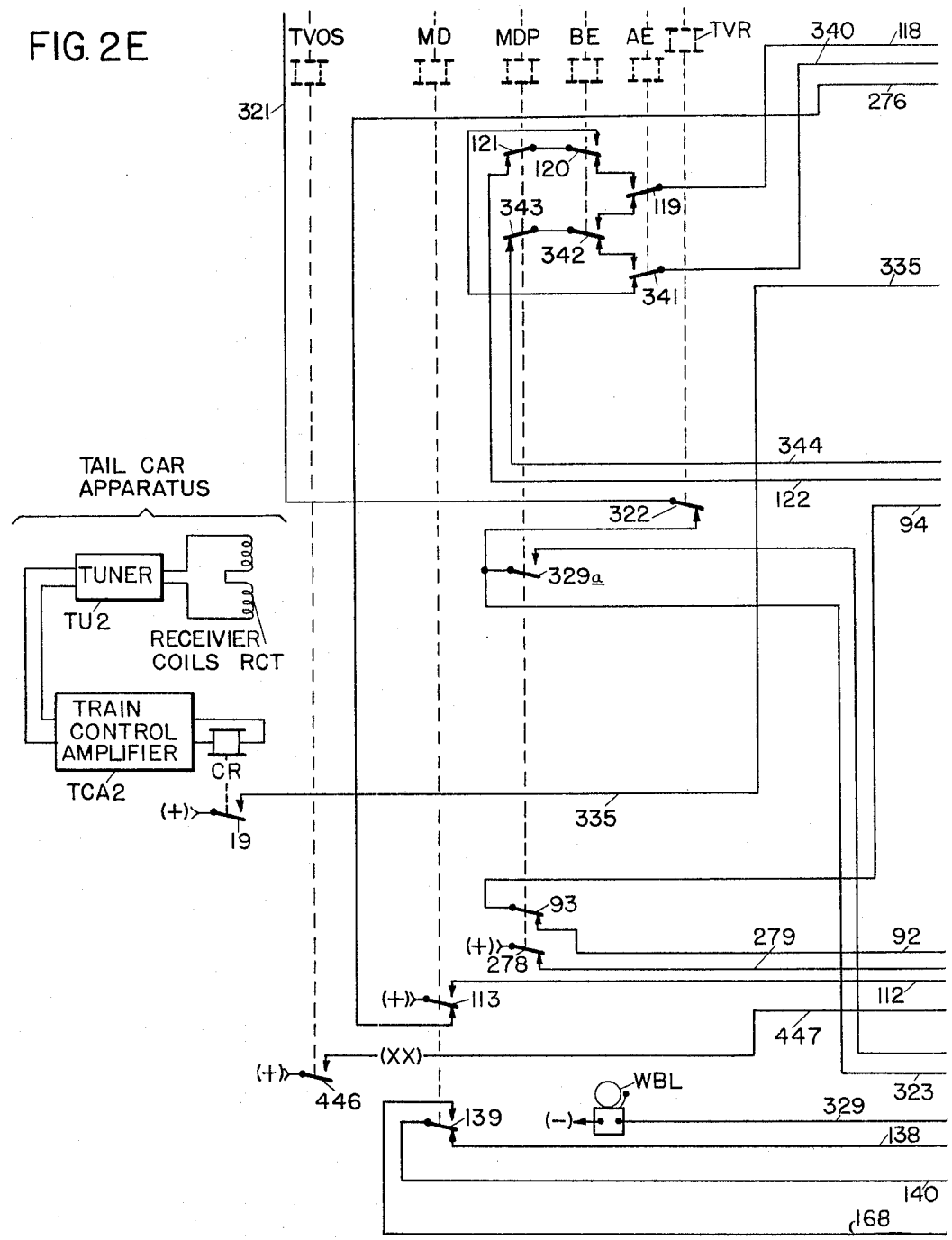

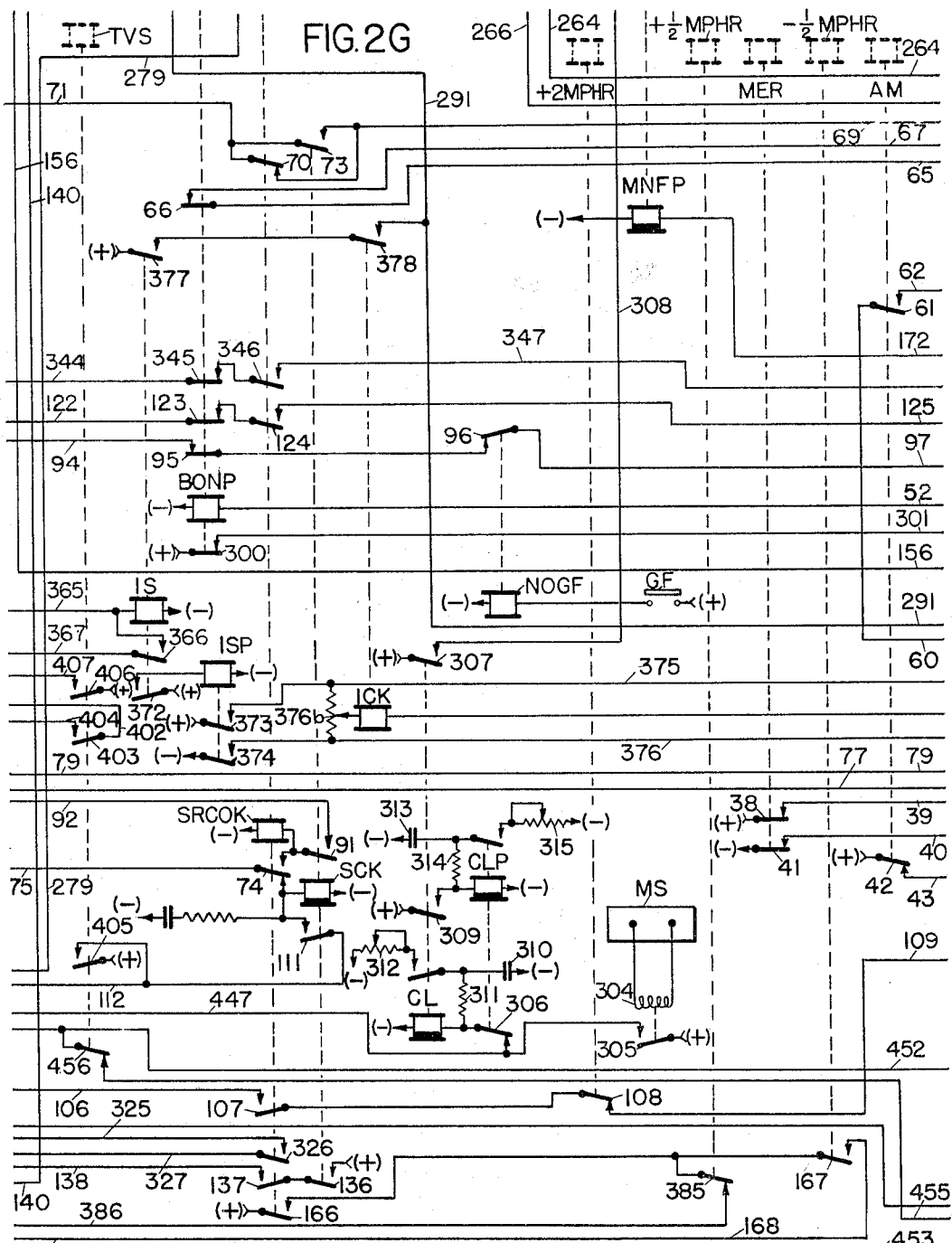

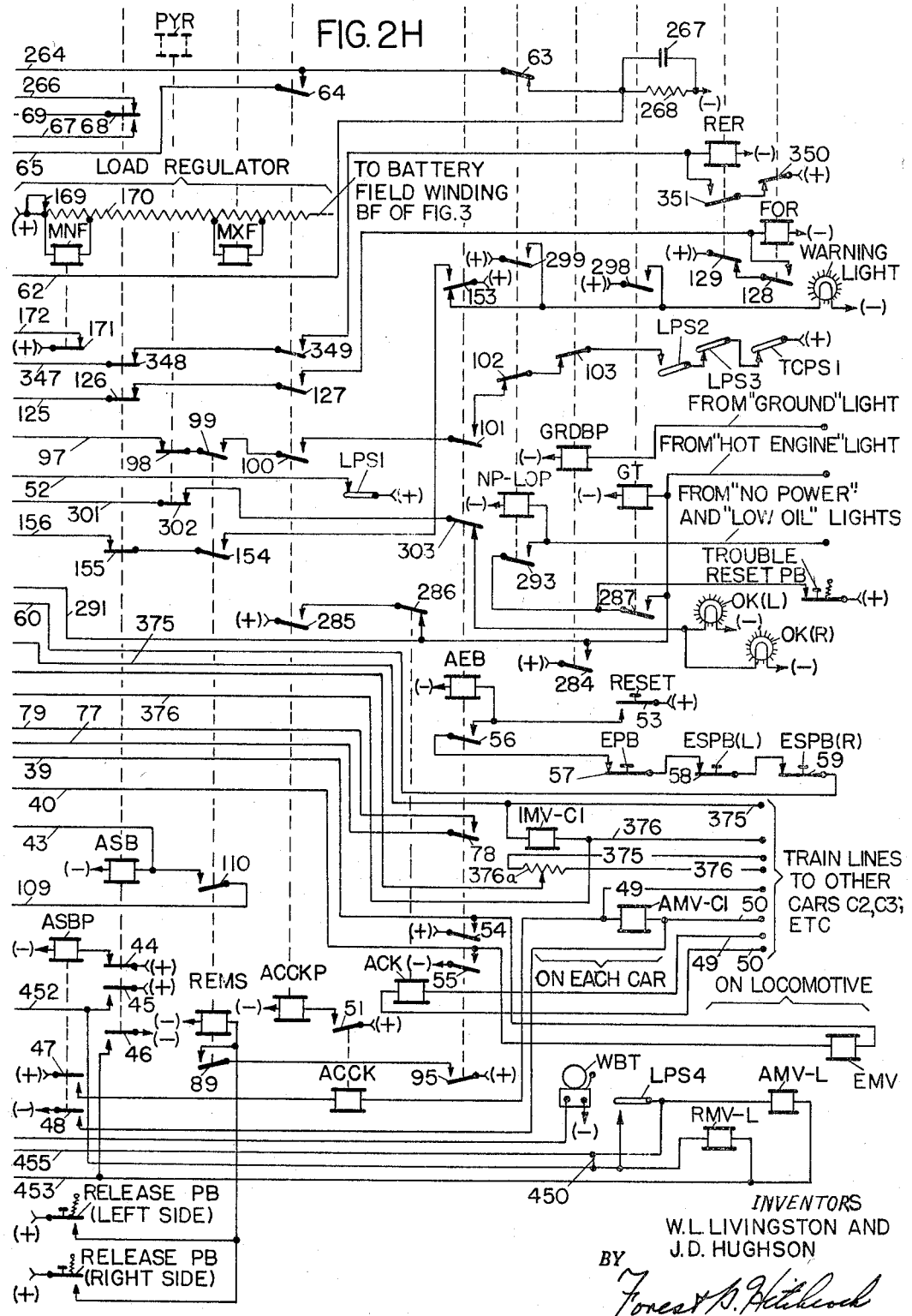

X = CONTROL WIRE ENERGIZED

| FIG. 2A | FIG. 2B | FIG. 2C | FIG. 2D |
|---|---|---|---|
| FIG. 2E | FIG. 2F | FIG. 2G | FIG. 2H |

*INVENTORS*
W.L. LIVINGSTON AND
J.D. HUGHSON

BY Forest B. Hitchcock

THEIR ATTORNEY

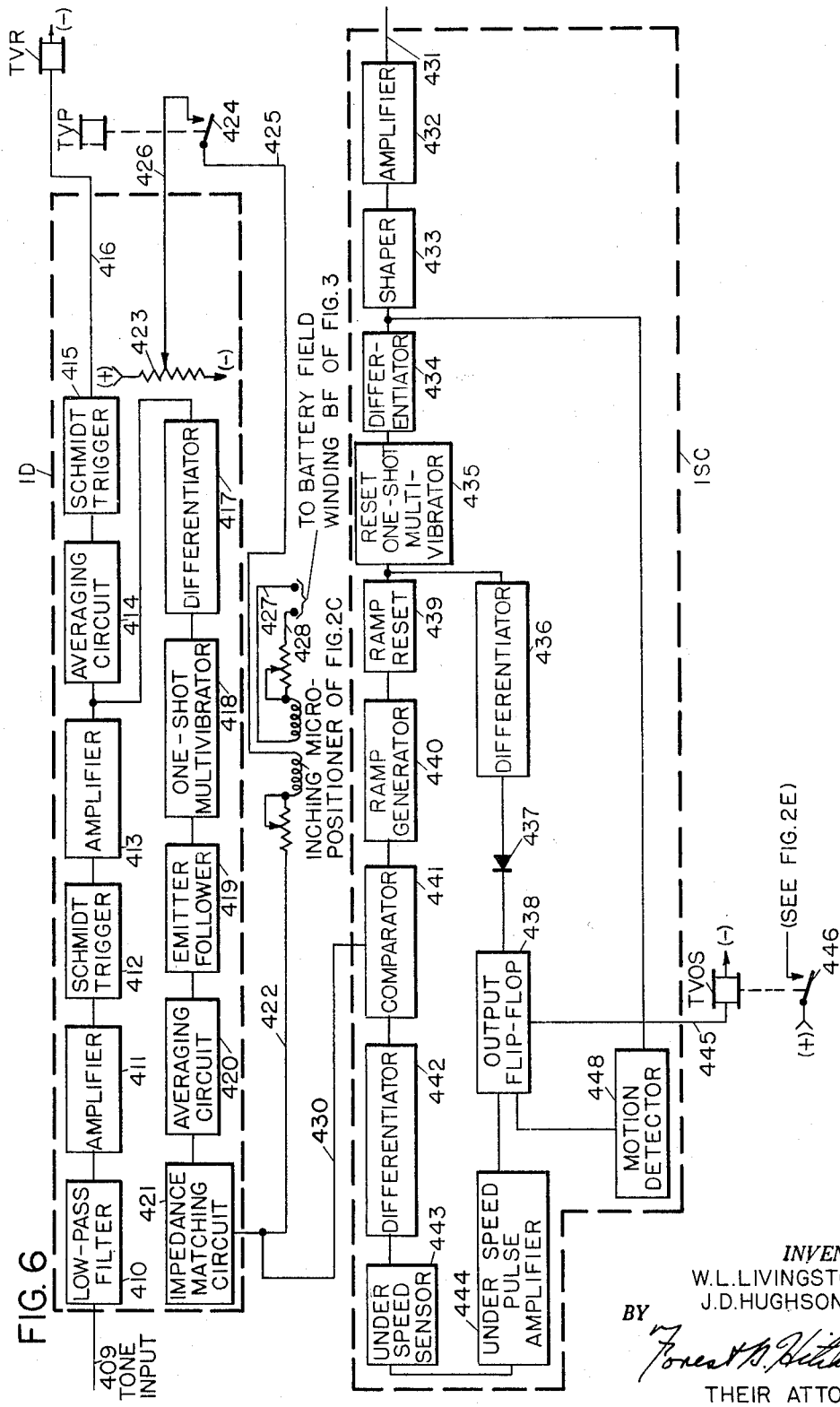

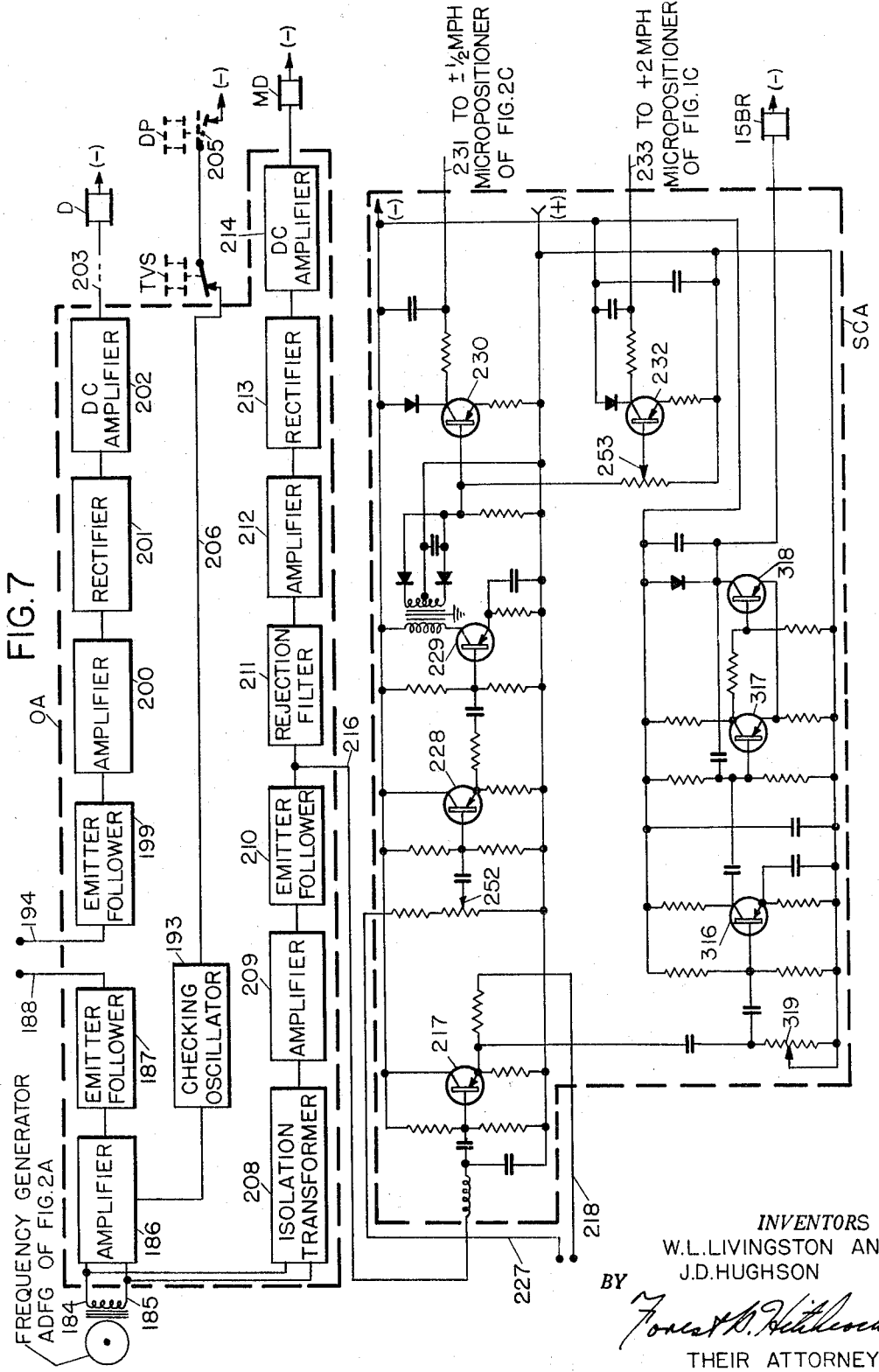

United States Patent Office
3,287,555
Patented Nov. 22, 1966

3,287,555
AUTOMATIC VEHICLE CONTROL SYSTEM
Waltrus L. Livingston and J. Donald Hughson, Rochester, N.Y., assignors to General Signal Corporation, Rochester, N.Y., a corporation of New York
Filed Feb. 1, 1963, Ser. No. 255,624
18 Claims. (Cl. 246—187)

This invention generally relates to vehicle control systems and more particularly pertains to the automatic control of unmanned vehicles. Although the system of the present invention is adaptable to the control of various types of vehicles, it is particularly useful during the unmanned operation of railway trains.

In the specific embodiment disclosed herein, command information indicative of the desired train operation is communicated from the wayside to the vehicle and, suitable receiving means are employed on the vehicle to receive the command signals. This received command information is then effective on the vehicle to provide a vehicle carried registration of the desired train operation in accordance with which the vehicle is automatically operated. Any suitable form of selecting apparatus could be employed for selecting the particular command signals to be communicated to the vehicle. For example, the command signals to be communicated to the vehicle could be manually selected by an operator at a remote control office; they could be automatically selected in accordance with traffic conditions existing in advance of the vehicle, as is well known to those skilled in the art; or else, could be selected by a suitable programmer located either on the wayside or on the vehicle.

Also provided on the automatic train, in accordance with the present invention, is apparatus for monitoring the actual performance of the vehicle. This actual vehicle performance is then compared to the desired operation called for by the command information, and, the train is then automatically controlled so as to accurately maintain the actual operation of the vehicle at the desired operation being called for by the command information. More particularly, it is proposed in accordance with the illustrated embodiment of the present invention to utilize the wayside to vehicle command signals to instruct the vehicle as to its desired speed and direction of travel. In accordance with this command information and the actual speed of the train, the train throttle and/or brakes are then automatically operated so as to accurately maintain the actual train speed at the desired speed called for by the command signals from the wayside.

In addition to providing automatic train operation for the normal high, medium and low running speeds of thirty miles-per-hour, fifteen miles-per-hour and seven miles-per-hour respectively, apparatus is also provided in accordance with the present invention whereby an unmanned railway train can be accurately and automatically operated to run at the relatively low speed of two miles-per-hour, for example, and also at very low or inching speeds which might range, for example, between one-eighth and three-eighths of a mile-per-hour.

In accordance with the present invention, it is furthermore proposed to provide for readily adjusting the train carried apparatus utilized to compare the actual and desired train speeds, whereby the actual speed of the train may be controlled to remain within any desired range of the desired speed being called for by the command information.

In the selected embodiment shown herein, the railway train being automatically controlled in accordance with the present invention, is assumed to be driven by a locomotive of the diesel-electric type, wherein a diesel engine, an electric generator and a plurality of traction motors serve collectively as the power unit for the locomotive. On such diesel-electric type locomotives, an engine speed governor is provided for accurately controlling both the fuel supplied to the diesel engine and the generator loading on the engine, so as to accurately maintain the engine speed at that "ordered" by the locomotive throttle, as is well-known in the art.

More specifically, the engine speed governor normally provided on the diesel-electric type locomotives includes certain control solenoids, normally designated as the AV, BV, CV, and DV solenoids, which are selectively energized in predetermined combinations during manual train operation in accordance with the position of the engineman's throttle lever, to cause the governor to control the diesel engine to the various predetermined speeds associated with the various throttle positions.

The engine speed governor furthermore includes certain automatically actuated valves which operate to control the setting of a load regulating rheostat (load regulator) connected in series with the battery field winding of the main generator, whereby the generator loading of the diesel engine is accurately and automatically varied towards a so-called "balance point" for each throttle setting and locomotive speed. In addition, a so-called "overriding solenoid" is also normally included in such engine speed governor and is effective, when energized by conventional circuitry provided on the locomotive, to override the normal movement of the load regulator towards its "balance point" and actuates the load regulator towards a "minimum field" position wherein a minimum current is supplied to the generator's battery field winding.

In accordance with the present invention, it is further proposed to render the automatic operation of the locomotive throttle dependent upon proper engine speed governor action; i.e., after a throttle setting has been made by the automatic throttle control apparatus to be described, a further throttle increase cannot be effected until the engine speed governor has properly controlled the generator loading on the diesel engine. By rendering the throttle stepping dependent upon proper governor action, smooth acceleration of the automatically operated vehicle is produced.

It is also proposed in accordance with the present invention, to provide a novel warning control system on the unmanned railway train whereby audible warning devices, located at either end of the railway train being controlled, are selectively actuated to provide warning to the wayside that the automated train is approaching, dependent upon which end of the train is leading as the train approaches the wayside location.

Safe procedures are also provided in accordance with the present invention, for converting a vehicle both from (1) automatic operation condition, wherein its throttle and brakes are automatically operated in accordance with command information registered on the vehicle, into manual operating condition wherein it is controlled by an engineman, and (2) from manual operation condition into condition for automatic operation in accordance with such command information.

More specifically, means are provided whereby a person on the wayside may initiate an automatic brake application on the automated vehicle so as to permit him to safely board the vehicle and return the vehicle to manual operating condition. Furthermore, the manual-to-automatic conversion procedure requires that an operator board the vehicle and perform at least one manual operation necessary to convert the vehicle into condition for automatic operation. It is then required, in accordance with the present invention, that the operator subsequently alight from the vehicle and perform a further manual operation from the wayside necessary to fully convert the locomotive into condition for automatic operation. It is apparent that such a procedure for manual-to-automatic vehicle conversion is safe and would prevent an automatic vehicle from being dispatched with personnel trapped aboard.

In accordance with the present invention, it is furthermore proposed to automatically check that the unmanned vehicle, to be automatically operated, is in proper working condition both when the vehicle is to be started from a standstill and also, while the vehicle is underway. In accordance with the specific embodiment shown herein, various possible trouble conditions are automatically monitored on the railway train and determine whether or not the vehicle is in proper working condition. Thus, such items as low oil pressure, failure in the high and low voltage electrical systems on the locomotive, insufficient lubricating oil pressure, etc. are automatically checked before the automatic vehicle can proceed in response to a proceed command signal registered on the vehicle. Furthermore, certain other items such as whether or not the engine is over-heated, etc. are also monitored, while the vehicle is underway, and, if trouble should occur, restrictive action is taken on the train; i.e., in the selected embodiment, the train is controlled to a predetermined low speed unless of course traffic conditions require a more restrictive train control, in which case the automated train will be operated in accordance with the command information from the wayside.

In view of the above considerations, one object of the present invention is to provide for automatically operating unmanned vehicles in accordance with command information indicative of the desired operation of the vehicle.

A further object of the present invention is to provide for automatically operating the throttle and brake mechanisms on an unmanned railway train so as to control the actual train speed in accordance with command information indicative of the desired train speed.

Another object of the present invention is to provide for automatic operation of railway trains at very low or inching speeds.

A further object of the present invention is to provide for continually detecting whether or not an unmanned vehicle is in proper condition for automatic operation, in accordance with command information indicative of the desired vehicle operation, and to render the actual vehicle performance dependent upon this detection of vehicle condition.

A further object of the present invention is to provide safe procedures for converting a vehicle between conditions for manual and automatic vehicle operation, whereby a single person may safely convert a vehicle either from manual operating condition into condition for fully automatic operation or from automatic into manual operating condition.

A more specific object of the present invention is to provide for automatic operation of the throttle on an unmanned railway locomotive wherein automatic throttle operation is rendered dependent upon proper operation of an engine speed governor provided on the locomotive.

A further object of the present invention is to provide for automatically and selectively actuating warning devices at either end of the vehicle to give warning to the wayside that the vehicle is approaching, as selected in accordance with whichever end of the vehicle is leading as the vehicle approaches a predetermined wayside location.

Other objects, purposes and characteristic features of the present invention will in part be pointed out as the description of the present invention progresses and part obvious from the accompanying drawings. In describing the invention in detail, reference will be made to the accompanying drawings in which:

FIG. 1 is a block diagram illustrating one specific embodiment of the present invention;

FIGS. 2A through 2H illustrate in detail, the vehicle carried control apparatus of FIG. 1, according to the present invention, for automatically operating a railway train powered by a diesel-electric type locomotive;

FIG. 6 illustrates in detailed block diagram of certain electronic control apparatus of FIG. 2A; and FIG. 7 further illustrates, partially in block diagram form and partially in detailed circuit form, certain other electronic apparatus of FIG. 2A.

Figure 2F:
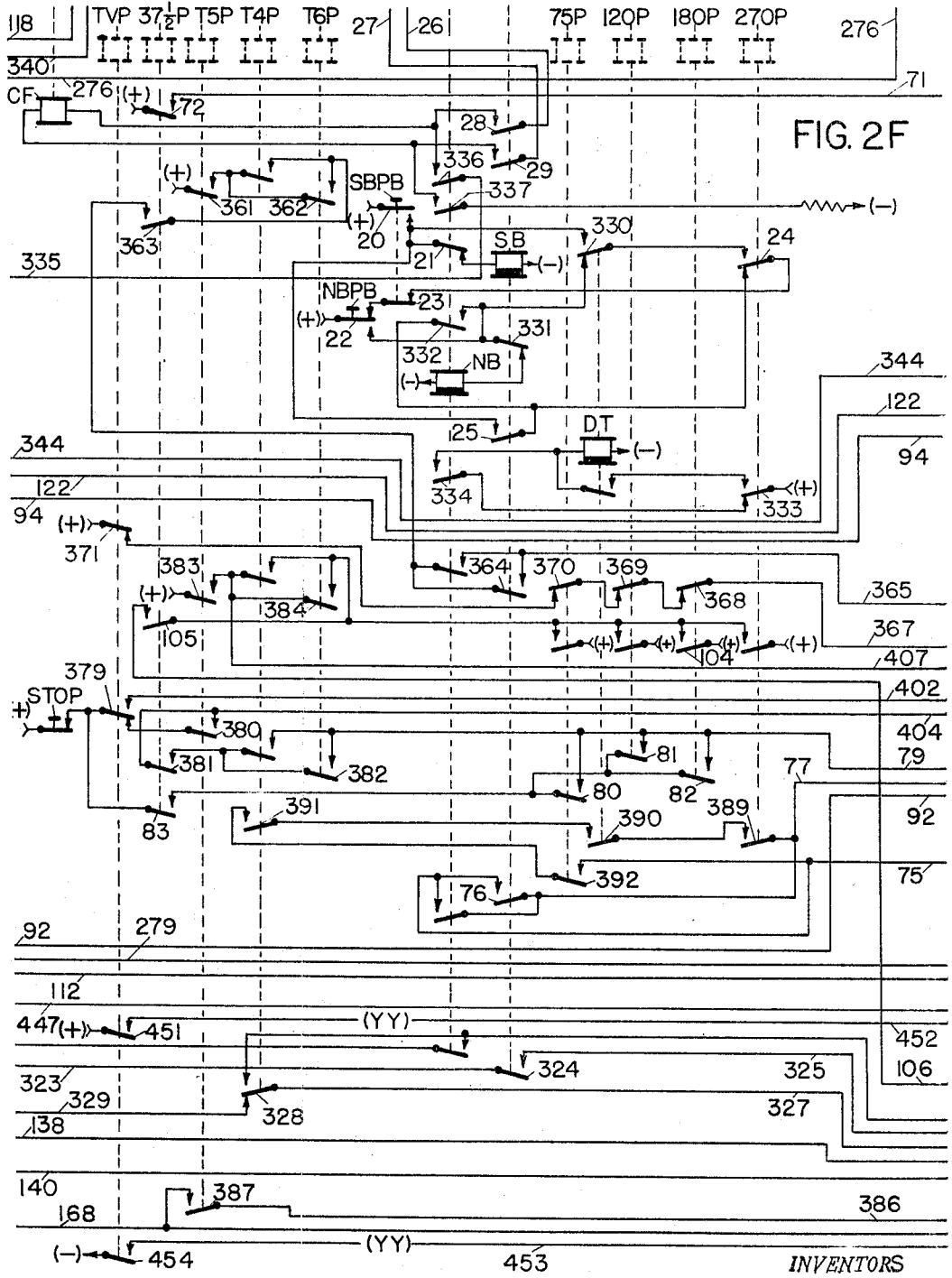

In order to simplify the drawings and the explanation of the illustrated embodiment of the present invention, various conventional symbols are utilized in the drawings. For example, arrowheads and arrowtails with associated symbols (—) and (+), respectively, are utilized and are intended to represent opposite terminals of suitable sources of electric current, and it is to be understood that such sources of current may be of any suitable forms for the purposes intended.

Before beginning a detailed description of the automatic train operation provided by the illustrated embodiment of the present invention, reference should be made to FIG. 1 and the general block diagram illustrated therein.

General description

As previously mentioned, the vehicle control system of the present invention is embodied in this disclosure in the form of a system for automatically operating an unmanned railway train, powered by a diesel-electric type locomotive, in accordance with electrical command signals communicated from the wayside to the train. In the illustrated embodiment of this invention, two different communication channels are assumed as being utilized for communicating this command information from the wayside to the train. More specifically, one such channel employs a base frequency of alternating current (for example 100 cycles per second) coded at predetermined code rates of 37½, 75, 120, 180 and 270 pulses per minute, while the other communication channel employs a carrier frequency (for example, 960 cycles per second) modulated by audio tones TV, T4, T5, and T6. For example, the coded alternating current might be communicated from the wayside to the train via the track rails, while the modulated carrier frequency could be applied to suitable wayside loop circuits for communication to the vehicle. The particular commands associated with each of these assumed signals will be pointed out hereinafter.

Receiver means in the form of pick-up coils RCA and RCB are provided at ends "A" and "B" of the locomotive respectively, to inductively receive the command signals, and receiver selection circuitry RS is utilized, whereby selection is made between the receiver coils on the "A" or "B" ends of the locomotive, depending upon which end of the locomotive is connected to the trailing cars.

More particularly, the receiver selection apparatus RS illustrated in block form in FIG. 1 includes the push buttons AEPB and BEPB of FIG. 2A and the associated relays AE and BE. The command information received by the selected locomotive receiver coils is then applied to a locomotive carrier tuner TU1 which is utilized to reject all but the base frequency of the coded track current and the carrier frequency utilized to communicate the audio tones to the train. From the output of the locomotive carried tuner TU1, the track code information received from the wayside is fed to a train control amplifier TCA1 which is utilized to amplify the received track code rates, while the tone modulated carrier frequency is supplied to a carrier amplifier CA which similarly amplifies the carrier frequency information.

Connected to the output of the carrier amplifier CA, is an audio amplifier AA which separates the modulating tones from the carrier frequency; amplifies these audio tones; and causes selective energization of the tone relays T4R, T5R and T6R of FIG. 2A dependent upon which tones are received, whereby the desired train performance, as indicated by which tones are modulating the received carrier frequency, is registered on the aforementioned tone relays.

Referring to FIG. 1, the tail car of the train is also provided with receiving apparatus including suitable receiver coils RCT for inductively receiving track code information indicative of the desired train performance while the train is operating with the tail car leading, as will be decided. These tail car receiver coils supply input to a tuner TU2, similar to that carried on the locomotive, which rejects all but the base frequency of the coded track currents. Thus, in the illustrated embodiment of the present invention, the locomotive is equipped to receive both the coded track currents and the modulated carrier frequency, while the tail car is equipped to receive only the coded track currents. However, it should be understood that the tail car could also be equipped to receive the modulated carrier, without in any manner departing from the spirit or scope of the present invention.

At the output of the tuner TU2 is a train control amplifier TCA2 similar to that carried on the locomotive. This tail car train control amplifier is utilized to amplify the track code information being received by the tail car receiver coils and operates a code responsive relay CR dependent upon the particular track code being received. The tail car apparatus shown in FIG. 1 is also illustrated in FIG. 2E of the accompanying drawings.

Certain direction selecting apparatus DS is provided in accordance with the present invention and is operated dependent upon the desired direction of travel of the vehicle, so as to render either the selected receiver coils on the locomotive or those on the tail car effective to receive the train signals communicated from the wayside to the vehicle. With reference to FIG. 2F, this direction selection apparatus DS includes push buttons NBPB and SBPB and associated relays NB, SB and DT, the operation of which will be described in more detail hereinafter.

Depending upon the desired direction of travel, the code following relay CF of FIGS. 1 and 2F is then actuated at the received track code rate. This code following relay CF then controls the input to decoding apparatus, including the various decoder units DU of FIG. 2B each having a decoding relay R connected at its output for registering the desired train performance in accordance with the received track code rates.

Also included in the locomotive command reception apparatus of FIG. 1 is an inching discriminator ID which is utilized for converting a variable tone, transmitted from the wayside to the train into a D.-C. voltage whose magnitude is proportional to a desired very low or inching speed. As will be pointed out in more detail hereinafter, this inching discriminator ID forms part of a novel speed control organization provided by the present invention whereby a railway locomotive, for example, may be controlled to properly operate at a very low or inching speed range such as, for example, between one-eighth and three-eighths of a mile-per-hour.

Referring to FIG. 1, the command information registered on the tone relays of FIG. 2A and the decoding relays of FIG. 2B then is utilized as input to certain command and speed comparison apparatus CSC provided on the vehicle whose function will be described in more detail hereinafter.

In order that the automated railway train be properly controlled in accordance with the desired performance being commanded by the wayside, an axle-driven frequency generator ADFG is provided on the locomotive (see FIG. 2A), and produces an output frequency which is proportional to the actual speed of the train, as is familiar to those skilled in the art. The output of this axle-driven frequency generator ADFG is coupled to an inching speed control unit ISC along with the D.-C. voltage analog of the desired inching speed as developed by the inching discriminator ID. In the inching speed control unit ISC, the actual and desired inching speeds are compared so that the command and speed comparison unit CSC shown in FIG. 1 can be properly controlled to provide that operation of the throttle and brake apparatus of the train necessary to maintain the desired inching speed.

Included in the train speed indication apparatus of FIG. 1, is an overspeed amplifilter OA and a speed control amplifilter SCA which, together with certain speed filters to be described in more detail hereinafter, operate to register whether or not the actual speed of the vehicle is remaining within certain predetermined speed limits associated with the other speed commands from the wayside. More particularly, the speed filters shown in FIG. 1 represent a plurality of filters of the high-pass variety, each having a pass frequency preselected in accordance with the output frequency of the axle-driven frequency generator ADFG for various train speeds. Thus, a particular one of these speed filters will be connected to the output of the frequency generator ADFG, as selected by the desired speed being called for by the command information communicated to the train from the wayside; i.e. as registered by the tone relays of FIG. 2A and the decoding relays of FIG. 2B. These speed filters are more particularly shown in FIG. 2B of the accompanying drawings and include the high-pass filters labeled as the 33 m.p.h., 30 m.p.h., 17.5 m.p.h., 15 m.p.h., 9.5 m.p.h., 7 m.p.h. and 2 m.p.h. filters. It should be pointed out here that each of these speed filters will pass all frequencies higher than the frequency output of the axle-driven frequency generator ADFG at the speed designated for the speed filter; e.g., the 30 m.p.h. filter will pass the output of the axle generator when the actual train speed is above thirty miles-per-hour. The operation of this train speed comparison apparatus, including overspeed amplifilter OA, the speed amplifilter SCA and the various speed filters of FIG. 2B will be set forth in detail hereinafter.

Also included in the train speed indication portion of FIG. 1 is a motion detection unit for detecting whether or not the train is in motion, and includes relays MD and MDP of FIG. 2A.

In accordance with the desired train speed being registered by the tone relays of FIG. 2A and the decoding relays of FIG. 2B, and also in accordance with the comparison of the actual train speed with this desired speed by the train speed indication apparatus of FIG. 1, the command and speed comparison apparatus CSC of FIG. 1 is utilized, in the selected embodment of the present invention, to cause the proper operation of the throttle and brake apparatus of the vehicle, whereby the actual speed is made to conform with the desired value being called for from the wayside.

More specifically, the throttle control apparatus TC of FIG. 1, provided in accordance with the illustrated embodiment, includes the throttle stepper switch TSS of FIGS. 2C and 2D and associated circuitry for automatically adjusting the throttling on the unmanned locomotive and a control circuit for the so-called "overriding solenoid" normally provided on the diesel-electric type locomotive assumed as being controlled in accordance with the selected embodiment of the present invention.

Furthermore, the brake control apparatus BC shown in block diagram form in FIG. 1 more particularly includes train brake control magnet valves (for example, magnet valves AMV–C1 and IMV–C1 of FIG. 2H) provided on each car of the train for controlling application of the train air brakes, the locomotive brake control magnet valves RMV–L and AMV–L provided on the locomotive to control the independent locomotive brakes, and furthermore, the emergency brake magnet valve EMV for controlling an emergency application of the vehicle brakes.

In order to insure that the train is properly operating in accordance with the throttle and brake commands, the train performance is continually monitored and is reported back to the command apparatus of FIG. 1 where it is utilized, as will be described.

More particularly, means are provided in accordance with the present invention for interlocking the operation of the train throttle and brake apparatus to insure proper automatic operation, and, for causing the unmanned vehicle to be properly operated in accordance with any troubles that may occur either when placing the train in automatic operating condition or after the unmanned train is underway. For example, during manual operation, the engineman on a diesel-electric locomotive is provided with various indicating lights whereby he can visually detect if any trouble occurs so that appropriate action may be taken. Thus, such things as a hot engine, low oil pressure, no A.C. power or a ground on the locomotive high voltage system are normally checked on the locomotive by automatic detecting apparatus well-known in the art and indicated by so-called "HOT ENGINE," "LOW OIL," "NO POWER" and "GROUND" lights respectively.

However, since the present invention proposes a completely automated vehicle, it is necessary that appropriate action be automatically taken if these or any other trouble condition arise. With reference to FIG. 2H, more specifically, the so-called "GROUND" light is lit, to register that a "ground" has occurred on the locomotive high voltage system; the relay NP–LOP is assumed to be energized whenever either of the so-called "NO POWER" or "LOW OIL" lights is lit, to register respectively that the locomotive A.C. power system has failed or that the engine lubricating oil pressure is low; and, the general trouble relay GT is assumed to be energized, for example, whenever the so-called "HOT ENGINE" light is lit, to register that the diesel engine is overheating. Obviously, these trouble registering relays provided by the present invention could be directly controlled by the conventional trouble detecting apparatus of the railway train, if desired, when the train is being automatically controlled, so that the unmanned vehicle will not be improperly operated during such trouble conditions.

In order to provide smooth operation of the automated diesel electric locomotive being controlled in accordance with the illustrated embodiment of the present invention, the stepping of the locomotive throttle stepper switch TSS of FIG. 2D, is rendered dependent upon proper action by the engine speed governor normally provided on such diesel electric type locomotives. More particularly, the engine speed governor is effective, when the locomotive is being manually operated, to properly control the loading by the main generator on the diesel engine so as to maintain a predetermined power output for each throttle position. In accordance with the present invention, the actuation of the stepper switch TSS is rendered dependent upon proper governor action so that an automatic change in the throttle setting will not be taken until the generator loading on the engine has been properly adjusted by the governor for the preceding throttle position, thus insuring smooth acceleration and deceleration of the automated vehicle.

As previously pointed out, the system of the present invention furthermore provides for actuation of warning devices on each end of the vehicle, dependent upon direction of travel, so as to afford warning to the wayside that the automated vehicle is approaching. Thus, in accordance with the selected embodiment shown in the drawings, whenever the automated train is travelling at less than fifteen miles-per-hour, one or the other of two warning bells on the train is actuated to give audible warning to the wayside that the unmanned train is approaching; it being assumed here that suitable wayside apparatus (not shown) is rendered effective, as is well-known in the art, to communicate the proper commands to the vehicle ordering it to travel at less than fifteen miles-per-hour as the vehicle approaches such wayside locations. More particularly, a warning bell WBL (see FIG. 2E) is provided on the locomotive and is actuated, if the locomotive is leading, to provide an audible warning to the wayside that the train is approaching, and similarly, warning bell WBT of FIG. 2H is provided on the tail car of the train and is automatically actuated to give the same audible warning to the wayside in the event the tail car is leading as the train approaches the wayside location.

Having thus described the general organization of the illustrated embodiment of the present invention, a more detailed operational description will now be set forth assuming that a train equipped with the apparatus of FIGS. 2A through 2H is standing on the track rails with its independent locomotive and train brakes having been previously manually applied and its throttle in the IDLE position.

Manual to automatic conversion

In order to convert the train from manual to automatic operating condition, it is necessary for an authorized person to: (1) board the locomotive; (2) perform certain manual operations necessary to partially place the vehicle in condition of automatic operation in accordance with the aforementioned command information; and (3) to alight from the locomotive and perform at least one more manual operation from the wayside required to fully place the vehicle in automatic operating condition. As previously mentioned, this procedure helps guard against the possibility of dispatching the automated train with personnel trapped aboard.

To begin, the operator converting the train into automatic operating condition boards the locomotive and depresses push button AEPB or push button BEPB of FIG. 2A, depending upon which end of the locomotive is coupled to the trailing cars. For example, if the "B" end of the locomotive is coupled, receiver coils RCA on the "A" end of the locomotive would be rendered effective to inductively receive the command information communicated to the vehicle. Thus, with the push button AEPB depressed, the energizing circuit for relay AE of FIG. 2A is then completed and extends from (+), through the closed back contact 10 of push button AEPB, back contact 11 of the motion detector repeater relay MDP to check that the train is standing still, and to (—), and thereafter, relay AE is provided with a stick circuit including its own front contact 12 and back contact 13 of relay BE. With the receiver selecting relay AE now picked up, the receiver coils RCA are connected, via shielded cable 14 and front contacts 15 and 16 of relay AE, as input to the tuner TU1 of FIG. 2A.

As previously pointed out, the tuner TU1 is utilized to pass only the command signals being received by the receiver coils RCA, which signals may be in the form of either a coded track rail current of one hundred cycles per second base frequency, for example, or a tone modulated carrier frequency of one kilocycle, for example. From this tuner TU1, any modulated carrier frequency information received is applied along cable 17 to a suitable carrier frequency amplifier CA, while the received coded track circuit information is applied along cable 18 to the train control amplifier TCA1, wherein such track codes are converted into pulses of sufficient amplitude for operating the code following relay CF of FIG. 2F, when necessary.

With reference to FIG. 2E, the tail car of the train is also provided with track code receiving apparatus including receiver coils RCT, tuner TU2 and train control amplifier TCA2, whereby the code responsive relay CR is selectively energized to close its front contact 19 at the code rate being received by receiver coils RCT.

It is now necessary for the operator to select the desired direction of travel for the train; i.e., whether the locomotive or the tail car is to lead during subsequent operation of the vehicle. Assuming that the locomotive is to lead, and that this corresponds to travel in a southbound direction, the operator momentarily depresses push button SBPB of FIG. 2F and thereby energizes relay SB over a circuit including the closed back contact 20 of push button SBPB and back contact 21 of relay NB. When the push button SBPB is subsequently released, the relay SB is then provided with a stick circuit including front contact 22 of the push button NBPB, front contact 23 of push button SBPB, back contact 24 of code repeater relay 270P, front contact 25 of relay SB, and back contact 21 of relay NB. It is thus apparent that the relay SB is retained in its picked up position until the opposite direction of travel is selected for the train, in accordance with the picking up of relay NB, as will be described hereinafter.

It will now be assumed that the track rails upon which the locomotive is standing are energized with current coded at one of the aforementioned proceed track code rates of 75, 120 or 180 pulses per minute. Thus, with the relay SB now picked up to register that the locomotive is to lead, the code following relay CF of FIG. 2F is now energized, in accordance with the track code information from the train control amplifier TCA1 of FIG. 2A (as received by receiver coils RCA), over wires 26 and 27 between FIGS. 2A, 2B and 2F, and front contacts 28 and 29 of relay SB. This coding of relay CF causes its front and back contacts 30 and 31 of FIG. 2B to be operated at the received track code rate for selectively energizing the code relays 37½R, 75R, 120R, 108R, and 270R so as to register the desired train operation.

With reference to the following tabulation, the various command signals being utilized in the illustrated embodiment of this invention are listed, along with the corresponding desired automatic train operation.

Command signal: Desired automatic train operation
- No code _____ Emergency brake application.
- 37½ code rate . Service brake application.
- 75 code rate __ Proceed at seven miles-per-hour.
- 120 code rate __ Proceed at fifteen miles-per-hour.
- 180 code rate _ Proceed at thirty miles-per-hour.
- 270 code rate _ Change direction.
- Variable tone TV . Proceed at inching speed.
- Tone T4 _____ Tail car to lead.
- Tone T5 _____ Proceed at two miles-per-hour.
- Tone T6 _____ Locomotive to lead.

After the desired direction of travel has been selected by the operator, in accordance with the depression of push button SBPB, the automation push button AUTO of FIG. 2D is depressed so as to complete an energizing circuit for the relay A–M of FIG. 2C extending through back contact 32 of the push button and along wire 33 between FIGS. 2D and 2C. Automation relay A–M is thereafter retained in its picked up position by a stick circuit including its own front contact 34, wire 35 between FIGS. 2C and 2D, and the normally closed contact 36 of the manual push button MAN. With the relay A–M now picked up, the normally energized manual emergency relay MER of FIG. 2C is now deenergized by the opening of back contact 37 of the automation relay A–M. This relay MER is utilized as will be described, for controlling emergency application of the train air brakes.

With relay MER now dropped away, the emergency brake magnet valve EMV (see FIG. 2H) is now deenergized to vent the train brake pipe to the atmosphere and causes full application of the train brakes. This magnet valve EMV thus insures that the train air brakes are applied during conversion of the vehicle from manual to automatic operating condition. More specifically, the emergency magnet valve EMV of FIG. 2H is normally energized by a circuit extending from (+) in FIG. 2G, through front contact 38 of relay MER, wire 39 between FIGS. 2G and 2H, wire 40 between FIGS. 2H and 2G, through front contact 41 of relay MER, and to (−), and thus, the opening of front contacts 38 and 41, due to the dropping away of relay MER, deenergizes the magnet valve EMV to apply the train brakes. The picking up of automation relay A–M of FIG. 2C furthermore opens the normally closed energizing circuit for relay ASB of FIG. 2H extending through back contact 42 of relay A–M and along wire 43 between FIGS. 2G and 2H. With relay ASB dropped away, its repeater relay ASBP is also released by the opening of front contact 44 of the relay ASB.

Furthermore, with back contacts 45 and 46 of relay ASB now closed, an energizing circuit is completed for magnet valves AMV–L and RMV–L of FIG. 2H which control the automatic application and release of the independent locomotive air brakes. More specifically, in the selected embodiment of the present invention, the magnet valves AMV–L and RMV–L are connected into the independent air brake system for the locomotive in such a manner that the locomotive brakes are applied when both of these magnet valves are energized, and the locomotive brakes are released when both of these magnet valves are deenergized. Thus, with the relay ASB dropped away, as described above, the magnet valves AMV–L and RMV–L are both energized, to call for an automatic application of the independent locomotive brakes.

As previously mentioned, repeater relay ASBP is now also dropped away and closes its back contacts 47 and 48 so as to energize the train brake application magnet valves provided for each car of the train; e.g. magnet valve AMV–C1 of FIG. 2H provided for the first car, via trainline wires 49 and 50 which extend throughout the entire length of the train and are furthermore connected to opposite sides of the winding for relay ACK of FIG. 2H, whereby the relay ACK checks that the trainlines 49 and 50 are not open-circuited throughout the entire train length. These train brake valves are connected into the train air brake system in such a manner that when energized, they call for an automatic reduction of the brake pipe pressure to cause application of the train brakes, and, when they are deenergized, call for the train air brakes to release. In order to check that a predetermined number of these train brake application magnet valves are properly energized when relay ASBP drops away, to call for application of the train air brakes, the relay ACCK is inserted in series with the trainline wires 49 and 50 and is only picked up if the current magnitude in wires 49 and 50 is sufficient to indicate that the predetermined number of the magnet valves are energized. With the train brakes properly applied, as previously discussed, the relay ACCK is thus picked up to close its front contact 51 for energizing its repeater relay ACCKP. Furthermore, pressure switch LPS1 of FIG. 2H also detects whether the locomotive brakes are applied by registering for example, that the brake cylinder pressure is above a predetermined value; i.e., if the locomotive brakes are on, pressure switch LPS1 is closed to energize relay BONP of FIG. 2G over wire 52.

The operator converting the train from manual to automatic operating condition now depresses the push button RESET (see FIG. 2H) to energize the relay AEB of FIG. 2H by a circuit including contact 53 of the push button. This relay AEB will be stuck in its picked up position, as will be described, only if a command signal is being received by receiver coils RCA of FIG. 2A and the vehicle is in proper condition to be automatically operated in accordance with such command signal from the wayside. This picking up of relay AEB furthermore causes reenergization of the emergency magnet valve EMV of FIG. 2H by the closure of its front contacts 54 and 55 so that the train brake pipe is no longer vented, and therefore, the brake pipe can now be charged and the train air brakes released, as will be described hereinafter.

More specifically, the stick circuit by which relay AEB is maintained in its picked up position, to permit the train brake pipe to be charged and the brakes to be released, includes its own front contact 56, the normally closed contact 57 of the emergency push button EBP located inside the cab of the locomotive to permit either the operator to manually call for an emergency brake application, the normally closed contacts 58 and 59 of emergency stop push buttons ESPB (L) and ESPB (R) respectively which are located on the left and right exterior sides of the locomotive respectively also to permit an operator on the wayside to cause an emergency brake application on the vehicle, wire 60 extending between FIGS. 2H and 2G, front contact 61 of the automation relay A–M, wire 62 between FIGS. 2G and 2H, back contact 63 of relay NP–LOP which is closed unless the "NO POWER" or "LOW OIL PRESSURE" lights on the locomotive are lit to indicate that a power failure has occurred in the A.C. power system of the locomotive or that the oil pressure in the diesel engine lubricating system is insufficient, front contact 64 of relay ACCKP which detects as previously described that the proper number of train brake application magnet valves are energized on the cars of the train to enforce a service brake application, wire 65 between FIGS. 2H and 2G, front contact 66 of relay BONP which detects that the locomotive brakes are applied, wire 67 between FIGS. 2G and 2H, back contact 68 of relay ASB which indicates that a brake application has been called for, wire 69 between FIGS. 2H and 2G, back contact 70 of relay SRCOK, wire 71 between FIGS. 2G and 2F, and front contact 72 of code repeater relay 37½P which is picked up as long as a code of at least 37½ pulses per minute is being received by the train.

With reference to this stick circuit for relay AEB, it should be noted that front contact 73 of relay SCK is connected in multiple with back contact 70 of relay SRCOK of FIG. 2G which is picked up before the automated vehicle can get underway. Therefore, it is also necessary that relay SCK of FIG. 2G be picked up to close its front contact 73, prior to the picking up of relay SRCOK, in order to maintain relay AEB picked up and thus prevent an emergency brake application.

More specifically, relay SCK checks that a direction of travel has been selected; that the relay AEB has been picked up to energize the emergency magnet value EMV of FIG. 2H; and, that a proceed track code is being received on the train, and, is energized by a circuit extending from (−) in FIGS. 2G and 2F, through front contact 76 of relay SB since the southbound direction of travel has been established for the train, wire 77 between FIGS. 2F, 2G and 2H, front contact 78 of relay AEB which indicates that a brake reset has been manually made on the vehicle, along wire 79 between FIGS. 2H, 2G and 2F, through one of the front contacts 80, 81 or 82 of code repeater relays 75P, 120P and 180P respectively which proves that a proceed track code command signal has been received from the wayside, front contact 83 of code repeater relay 37½P which is closed as long as a proceed track code is being received, the normally closed contact of the manual stop push button STOP of FIG. 2F, and to (+).

The operator on the train now actuates the manual brake control handles provided on the diesel-electric type locomotive to those positions for releasing the locomotive and train air brakes; e.g. the train brake handle is moved to that position wherein it will cause brake pipe to be charged with air. However, since the train brake application magnet valves (for example, magnet valve AMV–C1 of FIG. 2H) and the locomotive brake control magnet valves AMV–L and RMV–L of FIG. 2H are now energized, as previously described, the train and locomotive brakes remain applied even though the manual brake control levers have been moved to the brake releasing positions.

The operator has now completed the necessary manual operations on the vehicle and he therefore now alights from the locomotive cab so as to perform certain operations from the wayside necessary to fully place the vehicle in automatic operating condition. More specifically, a pair of release push buttons are provided, one on either side of the locomotive (see FIG. 2H), one of which must be actuated from the wayside in order to fully place the vehicle under automatic control in accordance with the received command information communicated from the wayside.

Assuming now that a 180 track code is being inductively received by receiver coils RCA of FIG. 2A, the code following relay CF of FIG. 2F is energized at the 180 code rate and operates its contacts 31 of FIG. 2B accordingly, so as to energize the conventional master transformer MT and decoding unit 180DU for picking up code relay 180R. With code relay 180R picked up, its repeater relay 180P is then also picked up by a circuit extending from (+) in FIG. 2D, through back contact 84 of general trouble relay GT, along wire 85 between FIGS. 2D, 2C and 2B, through back contact 85a of relay 75R, back contact 86 of relay 120R, front contact 87 of relay 180R, back contact 88 of relay 270R, and to (−). As mentioned previously, this picking up of code relay 180R and repeater relay 180P registers that the vehicle is desired to proceed at thirty miles-per-hour.

The operator then pushes one of the RELEASE push buttons and now completes an energizing circuit for relay REMS of FIG. 2H, extending from (+), through the closed contact of the depressed RELEASE push button, and to (−). It should be noted in FIG. 2H, that the relay REMS is thereafter provided with a stick circuit including its own front contact 89 and front contact 90 of relay AEB, whereby the relay REMS is stuck in its picked up position as long as the relay AEB remains picked up. As previously pointed out, the relay AEB is retained in its picked up position as long as the vehicle is in proper condition to be automatically operated.

With the relay REMS now picked up, the relay SRCOK of FIG. 2G is also energized, provided that the train is in proper condition to proceed. More particularly, the energizing circuit for relay SRCOK includes front contact 91 of relay SCK, wire 92 between FIGS. 2G, 2F and 2E, back contact 93 of the motion detector repeater relay MDP which proves that the train is not in motion, wire 94 between FIGS. 2E, 2F and 2G, front contact 95 of relay BONP which checks that the locomotive brakes are applied, back contact 96 of relay NOGF which detects that the conventional generator field contactor GF is properly actuated for getting the train underway, wire 97 between FIGS. 2G and 2H, front contact 98 of relay PYR which detects that the throttle has been manually placed in the IDLE position, front contact 99 of relay REMS which detects that the operator has alighted from the cab and manually depressed a RELEASE push button located on the side of the locomotive, front contact 100 of relay ACCKP which detects that a sufficient number of train brake application magnet valves have been energized, front contact 101 of relay AEB which checks that a manual reset of the brakes has been initiated, back contact 102 of relay NP–LOP, back contact 103 of relay GRDBP which is a repeater of the locomotive "ground relay" and indicates when dropped away that a ground has not occurred on the locomotive high voltage system, the closed contact of pressure switch LPS2 which indicates that an emergency brake application is not called for, and the closed contacts of pressure switches LPS3 and TCPS1 which are located on the locomotive and tail car respectively and register that there is proper braking pressure throughout the train.

With relays SRCOK and REMS now both picked up and a 180 code rate being received (code relay 180R picked up), an alternate pick-up circuit for relay ASB of FIG. 2H is now completed to release the locomotive and train brakes, extending from (+) in FIG. 2F, through front contact 104 of code repeater relay 180P, front contact 105 of code repeater relay 37½P, along wire 106 between FIGS. 2F and 2G, front contact 107 of relay SRCOK, back contact 108 of relay +2MPHR, wire 109 between FIGS. 2C and 2H, front contact 110 of relay REMS, and to (−).

More specifically, with the relay ASB picked up, the locomotive brake control magnet valves AMV–L and RMV–L of FIG. 2H are now deenergized and the independent locomotive brakes are thus released, as previously discussed, and furthermore its repeater relay ASBP is now also picked up so as to deenergize the train brake application magnet valves provided on each of the cars of the train (for example, magnet valve AMV–C1 of FIG. 2H). As previously mentioned, with these train brake application magnet valves now also deenergized, the automatic train brake application is now also released, and, the automated train is now in condition to be automatically operated in accordance with the command information being inductively received by the selected locomotive receiver coils RCA of FIG. 2A.

Before discussing how the automated train gets underway, it should be pointed out that the relay SRCOK, after being picked up as previously described, is provided with a stick circuit including its own front contact 74, wire 75 between FIGS. 2G and 2F, front contact 76 of relay SB, wire 77 between FIGS. 2F, 2G and 2H, front contact 78 of relay AEB, wire 79 between FIGS. 2H, 2G and 2F, front contact 82 of code repeater relay 180P, front contact 83 of relay 37½P, and the closed contact of the manual STOP push button. It should furthermore be noted that with relay SRCOK picked up, relay SCK is now deenergized by the opening of back contact 74 of relay SRCOK. However, for reasons to be described, relay SCK is made slow releasing and therefore does not immediately drop away.

Thus with reference to the above-mentioned stick circuit for relay AEB, it is seen that with relay SRCOK now picked up (back contact 70 opened), it is necessary that front contact 73 of relay SCK remain closed, to maintain relay AEB picked up, and prevent an emergency application of the vehicle air brakes. It is therefore necessary to establish a stick circuit for relay SCK before it drops away to deenergize relay AEB. More particularly, the stick circuit for relay SCK includes its own front contact 111, wire 112 between FIGS. 2G, 2F and 2E, and front contact 113 of the motion detector relay MD. Thus, the required stick circuit for relay SCK is established, providing the train properly starts in motion in response to the 180 proceed code rate now being received, and, if the train fails to get underway within the predetermined time, set by the drop away time of relay SCK, the relay AEB and the emergency brake magnet valve EMV of FIG. 2H are then deenergized to call for an emergency brake application.

In the illustrated embodiment of the present invention, the direction of train travel is directly determined by the relays RER and FOR of FIG. 2H which control the energization of wires RE and FO in FIG. 2D; i.e., if the relay FOR is picked up, wire FO is energized by the obvious circuit in FIGS. 2C and 2D including wire 113a and the closed front contact of relay FOR and causes the traction motors to be electrically connected for driving the locomotive in the forward direction (southbound); whereas, if relay RER is picked up, the control wire RE is energized to cause the locomotive to be driven in the reverse direction (northbound). More particularly, for the assumed southbound direction of travel with the locomotive leading, the forward relay FOR of FIG. 2H is energized to electrically connect traction motors for driving the vehicle in the forward direction by a circuit extending from (+) in FIG. 2C and including front contact 114 of relay A–M, wire 115 between FIGS. 2C and 2B, front contact 116 of the southbound relay SB, back contact 117 of relay T5P, wire 118 between FIGS. 2B, 2F and 2E, front contact 119 of receiver selector relay AE, back contact 120 of relay BE, back contact 121 of the motion detector repeater relay MDP, wire 122 between FIGS. 2E, 2F and 2G, front contact 123 of relay BONP which checks that the brakes are on, front contact 124 of the relay SRCOK, wire 125 between FIGS. 2G and 2H, front contact 126 of relay ASB, front contact 127 of relay ACCKP, and to (−). After the relay FOR has been picked up, it is then maintained in its picked up position by the obvious stick circuit including its own front contact 128 and back contact 129 of the reverse relay RER. Thus, the forward relay FOR is picked up between the time when the relay ASB is picked up to initiate a brake release and the time when the brakes are actually released as detected by the dropping away of relays BONP and ACCKP.

*Getting train underway*

Assuming now that the relays SCK and SRCOK are both properly picked up, as previously described, to indicate that the vehicle is ready for automatic operation, and, that the vehicle brakes have been properly released, the throttle control wire T3H of FIGS. 2C and 2D is now energized to call for a throttle increase from IDLE to the No. 3 power setting. However, before the details are set forth as to how the throttle setting is automatically advanced, the structure of the throttle stepper switch TSS of FIGS. 2C and 2D will be discussed.

This throttle stepper switch TSS includes a plurality of rotatable wafers WA through WL which are mounted in a stacked relationship as in normal wafer switches, and which rotate as a unit in either a clockwise or a counter-clockwise direction, in accordance with the energization of coils LCC and RCC of FIGS. 2C and 2D, respectively. More particularly, the energization of coil LCC of FIG. 2C causes the wafers WA through WL of the throttle stepper switch to move one step at a time in a clockwise direction, while the energization of coil RCC of FIG. 2D causes these wafers to be stepped in a counter-clockwise direction. More particularly, the wafers WA through WL are moved from one position to another each time the coil LCC or the coil RCC is energized, and, the throttle stepper switch TSS is so constructed that the coil LCC or RCC must be deenergized as each step is taken before a subsequent step can be made to the next position, in either the clockwise or counter-clockwise direction.

As will be discussed in detail hereinafter, the throttle stepper switch TSS is at times required to "home up" to a preselected throttle setting; e.g., the No. 3 throttle setting when throttle control wire T3H is energized for getting the train underway, and, in order to provide for properly energizing and deenergizing the coil LCC, as mentioned above, to cause the wafers WA through WL to step in the clockwise direction, a so-called commutating contact 130 is provided and is actuated by the movement of wafer WA so that it is momentarily opened to deenergize coil LCC as each step is made by wafer WA. Similarly, a commutating contact 131 is associated with wafer WL of FIG. 2D, and in substantially the same manner, causes coil RCC to be selectively energized and deenergized for stepping the wafers WA through WL in a counterclockwise direction when the throttle stepper switch TSS is ordered to "home down" to a preselected throttle position, for example, in accordance with the energization of either the throttle control wires IDH or T1H of FIGS. 2C and 2D which call for "homing" of throttle stepper switch TSS to those positions associated with the IDLE and No. 1 power settings of the locomotive throttle respectively.

In addition to the above-mentioned throttle control wires IDH, T1H and T3H which call for the throttle stepper switch TSS to "home" to those positions corresponding to the IDLE, No. 1 power, and No. 3 power setting respectively for the locomotive throttle, the stepper switch TSS is furthermore controlled by the throttle control wires TSI and TSD of FIGS. 2C and 2D which, when energized, call for the locomotive throttle setting to be increased and decreased respectively by one step. These throttle control wires TSI and TSD are more particularly utilized to maintain the actual speed of the train at the demand or desired speed called for by the received command signal, as will be described.

The throttle stepper switch TSS of FIGS. 2D and 2C is then effective to cause selective energization of the automatic control relays PYR, EXR, AVR, BVR, CVR, and DVR of FIG. 2D, for the purpose of selectively and automatically energizing the locomotive control wires PY, EX, AV, BV, CV and DV which are provided on the diesel-electric type locomotive, for automatically setting the driving power condition on the locomotive. More particularly, the energization of these control wires is directly controlled by the throttle lever when the train is being manually operated, and with reference to FIG. 4 of the accompanying drawings, these control wires determine the driving power developed by the locomotive power unit, as is well-known in the art. Of these, the wires AV, BV, CV and DV control certain engine governor solenoid valves, which determine the speed of the diesel engine, as is also well known in the art.

For example, with the throttle stepper switch TSS in the illustrated condition, the relay PYR is picked by a circuit including wire 132 between FIGS. 2D and 2C which is energized with wafer WD of FIG. 2C in the illustrated position. This picking up of relay PYR then causes energization of control wire PY of FIG. 2D by a circuit extending from (+) in FIG. 2C, along wire 133 between FIGS. 2C and 2D, and front contact 134 of relay PYR. It should be noted here that wire 133 is connected to (+) provided the manual throttle lever is in the IDLE position, as assumed above, and furthermore, that back contact 135 of relay A–M is connected in multiple with front contact 134 of relay PYR, whereby the control wire PY is directly controlled by the throttle lever when the train is being manually operated.

With reference to FIG. 2D, it should be noted that wafer WE is utilized for energizing a plurality of wires in accordance with the throttle position being called for by the throttle stepper switch TSS, and, it is assumed here that these wires lead to and cause selective energization of a corresponding plurality of throttle position indicator lights (not shown) which are provided on the locomotive to afford a visual indication that the automatic throttle control apparatus of this invention is functioning properly, and which would be particularly useful during any required testing of the control system.

As mentioned previously, the throttle control wire T3H of FIGS. 2C and 2D is energized when the automated train is ready to proceed in response to the 180 code rate now being received by coils RCA, of FIG. 2A. More particularly, the energizing circuit for this T3H control wire extends from (+) in FIG. 2G, through front contact 136 of relay SCK, front contact 137 of relay SRCOK, wire 138 between FIGS. 2G, 2F and 2E, back contact 139 of motion detector relay MD, wire 140 between FIGS. 2E, 2F, 2G and 2C, back contact 141 of relay BONP which detects that the locomotive brakes have now been released as previously described, wire 142 between FIGS. 2C and 2D, front contact 143 of relay ASB which detects that the train brakes have also been released, front contact 144 of relay AEB which detects that the emergency magnet valve EMV has been properly energized, and back contact 145 of relay GRDBP.

With the wire T3H of FIGS. 2D and 2C now energized, stepping coil LCC of the throttle stepper switch TSS is energized via the tab 146 on wafer WC in the illustrated position, wire 147 in FIGS. 2C and 2B, back contact 148 of relay TVP, wire 148a, contacts 149 and 150 of wafer WA, commutating contact 130, contacts 151 and 152 of wafer WB, and to (−). The wafers WA through WL are now advanced one step in the clockwise direction, and as previously pointed out, the commutating contact 130 is then momentarily opened to interrupt this energizing circuit for stepping coil LCC, as is necessary before the throttle stepper switch TSS can be advanced further.

With reference to FIG. 2C, it will be noted that with wafer WD advanced one position in the clockwise direction, the relay PYR is no longer energized; and, with reference to FIG. 2D, it will be noted that with wafer WJ now advanced one position in the clockwise direction, the relay EXR of FIG. 2D is energized by a circuit extending from (+) in FIG. 2H, through front contact 153 of relay AEB, front contact 154 of relay REMS, front contact 155 of relay ASB, along wire 156 between FIGS. 2H, 2G and 2C, back contact 157 of relay BONP, wire 158 between FIGS. 2C and 2D, contacts 159 and 160 of wafer WJ, and to (−). With relay EXR picked up, the control wire EX is then energized to cause the locomotive power unit to deliver the driving power output associated with the No. 1 throttle setting, by a circuit extending from (+) in FIG. 2C, through front contact 161 of the automation relay A–M, along wire 162 between FIGS. 2C and 2D, and through front contact 163 of the relay EXR.

As mentioned previously, the commutating contact 130 of FIG. 2C opens as the wafer WA is moved to its first clockwise position for momentarily deenergizing stepping coil LCC. Thus, with the throttle control wire T3H still energized over the previously described circuit; i.e. motion detector relay MD of FIG. 2A still dropped away to close its back contact 139 of FIG. 2E, the coil LCC would again be energized, over the previously discussed circuit including contact 149 on wafer WA, to move the wafers of the throttle stepper switch TSS to the next or second clockwise position to call for the No. 2 power setting on the locomotive. More specifically, with the wafers WA through WL now moved to their second clockwise position, relays EXR and AVR of FIG. 2D are now both picked up to energize control wires EX and AV of FIG. 2D, from wire 162, and call for the No. 2 power setting (see FIG. 4); the relay EXR being picked up over a circuit previously described including energized wire 158 and wafer WJ, and the relay AVR being picked up over a circuit including tab 164 of wafer WF which is now in position to connect the winding of relay AVR to the same energized wire 158.

Figures 3, 4, 5:
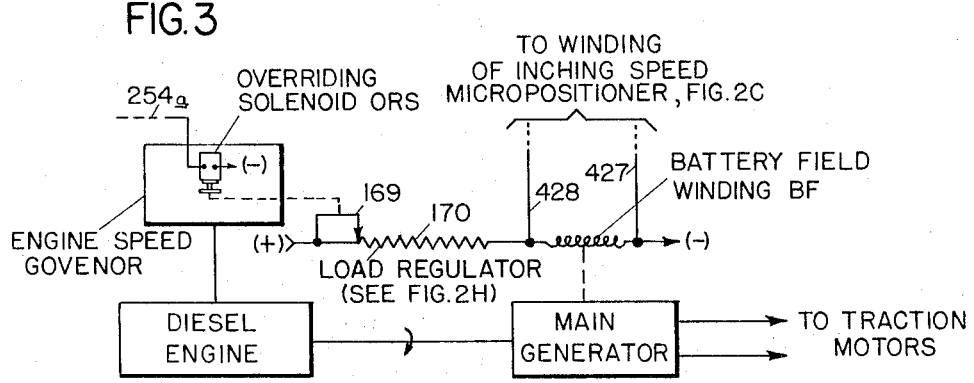
FIG. 3 is a diagrammatic illustration of the power unit on a conventional diesel-electric type locomotive.
FIG. 4 illustrates a power chart showing the selective energization of a plurality of throttle control wires, PY, EX, AV, BV, CV and DV normally provided on such diesel-electric locomotives.
FIG. 5 is an arrangement diagram illustrating the proper arrangement of FIGS. 2A through 2H to form an operable control system.

Similarly, assuming that commutating contact 130 has momentarily deenergized stepping coil LCC, and with throttle control wire T3H still energized, the wafers of the throttle stepper switch TSS are once again actuated by coil LCC to move to their third clockwise position, wherein the resulting positions of wafers WJ and WH cause relays EXR and CBR respectively of FIG. 2D to be energized by wire 162 to call for the No. 3 power setting on the locomotive (see FIG. 4). Furthermore, with wafer WA now advanced to its third clockwise position, indent 165 on wafer WA is now opposite contact 149, and therefore stepping coil LCC can no longer be energized from the throttle control wire T3H of FIGS. 2C and 2D. Thus, the throttle stepper switch TSS has been "homed" to the No. 3 throttling or power setting.

This increasing application of driving power from the locomotive power unit now causes the vehicle to start in motion, and, when the vehicle speed has increased to a predetermined value (found in practice to be approximately one mile per hour), motion detector relay MD of FIG. 2A now picks up to close its front contact 113 included in the previously described stick circuit for relay SCK. Assuming that this picking up of relay MD occurs before the dropaway time of relay SCK has elapsed, the relay SCK is maintained in its picked up position to prevent the relay AEB from dropping and causing an emergency brake application. Thus, a check has been made that the automated vehicle properly starts in motion within a predetermined time after the throttle stepping has been initiated.

It should also be pointed out at this time, that after the train gets underway and motion detector relay MD is picked up, the energizing circuit for throttle control wire T3H of FIGS. 2C and 2D now extends from (+) in FIG. 2G, through front contact 166 of relay SRCOK, front contact 167 of relay —½MPHR which detects that the actual train speed is more than one-half miles-per-hour below the desired speed (desired speed is thirty miles-per-hour with 180 code rate received), as will be described, along wire 168 between FIGS. 2G, 2F and 2E, and through front contact 139 of motion detector relay MD. Thus, the throttle stepper switch is controlled to "home" to that position wherein the No. 3 power setting is called for, even after motion of the train is detected, and as will be pointed out in detail hereinafter, as soon as the above-mentioned engine speed governor has properly adjusted the main generator loading on the diesel engine for this third throttling position, the throttle stepper switch TSS is then further advanced towards its highest or No. 8 power setting, by the throttle step increase control wire TSI of FIGS. 2C and 2D.

With more particular reference to FIG. 3 of the accompanying drawings, the main generator loading on the diesel engine is automatically controlled on the diesel-electric type locomotive by a conventional engine speed governor which automatically varies the position of movable arm 169 on the load regulating resistor 170 connected in series with the battery field winding BF of the main generator, as is well known to those skilled in the art, for the purpose of maintaining the power output of the locomotive power unit at that "ordered" by the position of the throttle stepper switch TSS.

More specifically, FIG. 3 illustrates the position taken by the movable arm 169 when the IDLE throttle setting is called for; i.e. the arm 169 is in its extreme left-hand or "minimum field" position wherein the current supplied to the battery field winding BF of the main generator, and therefore also the generator loading on the engine, is a minimum. However, when a high throttling condition is called for by the throttle stepper switch TSS (or the manual throttle lever during manual operation), the movable arm 169 is automatically controlled by the governor to move to the right along resistor 170, as viewed in FIG. 3, towards a so-called "balance point" whereby the current supplied to the field winding BF increases towards that value required to provide the proper generator loading on the engine for the particular throttle setting.

Also included in the engine speed governor of FIG. 3, is the so-called "overriding solenoid ORS" which is effective, when energized, to move arm 169 to the left along resistor 170 towards its "minimum field," and which must be deenergized before the movable arm 169 can move to the right on resistor 170 towards its "balanced point," as is well-known.

The load regulating portion of the locomotive power unit control organization (resistor 170 and movable arm 169) is also illustrated in FIG. 2H of the drawings. A relay MNF is connected across a small portion of resistor 170 at the extreme left-hand or "minimum field" end thereof, to detect whether or not the movable arm 169 is in the "minimum field" position (as shown), and is picked up with the arm 169 in the illustrated position and dropped away if the arm 169 is above or to the right of this "minimum field" position. Similarly, a relay MXF is connected across a small portion of resistor 170 to be dropped away just before the movable arm 169 reaches the so-called load "balance point" mentioned above; i.e. when a throttle setting other than IDLE is called for, the movable arm 169 moves to the right along resistor 170, and, in accordance with the present invention, shunts relay MXF just before the "balance point" for that throttle setting is reached.

As mentioned previously, with relay PYR of FIG. 2D picked up, to call for the IDLE throttling condition, the movable arm 169 is in its illustrated or "minimum field" position on the load regulator resistor 170, and relays MNF and MXF are both picked up. Furthermore, with relay MNF picked up, repeater relay MNFP of FIG. 2G is also energized over front contact 171 of relay MNF and wire 172 between FIGS. 2H and 2G.

Recalling now that the throttle stepper switch TSS has been actuated to that position wherein relays CVR and EXR of FIG. 2D are both picked up to call for the No. 3 power setting, the movable arm 169 is then automatically moved to the right along resistor 170, by the speed governor, towards the predetermined "balance point" for the No. 3 throttle position. As the movable arm 169 leaves its illustrated "minimum field" position, the relays MNF and MNFP are both dropped away, and, just before the movable arm 169 reaches the "balance point" for the third throttle setting, the relay MXF is also dropped away as previously discussed. This dropping away of relay MXF thus detects that the diesel engine has been properly loaded by the main generator for the third throttle setting.

With relays MNF and MXF now both released, the step increase throttle control wire TSI of FIGS. 2C and 2D is now energized by a circuit extending from (+) in FIG. 2A, through front contact 173 of the motion detector relay MD, along wire 174 between FIGS. 2A, 2B and 2C, back contact 175 of relay BONP, front contact 176 of relay SRCOK, back contact 177 of relay MNFP, front contact 178 of relay—½MPHR, wire 179 between FIGS. 2C and 2D, front contact 180 of relay ASB, back contact 181 of relay MXF, front contact 182 of relay AEB, and back contact 183 of relay GRDBP, and, the stepping coil LCC of throttle stepper switch TSS is provided with a direct energizing circuit including control wire TSI and contacts 151 and 152 of wafer WB; i.e. the energizing circuit for coil LCC does not include the commutating contact 130 of FIG. 2C. Thus, the throttle stepper switch TSS is actuated to its fourth clockwise position wherein the relays EXR, AVR and CVR of FIG. 2D are now picked up, to call for the No. 4 power setting on the locomtive (see FIG. 4).

However, as soon as this fourth power setting is called for, the engine speed governor automatically decreases the load on the diesel engine, by drawing movable arm 169 (see FIG. 2H) towards its "minimum field" position, as is well known in the art, so that the engine can come up to the speed associated with the No. 4 throttle setting at minimum load. Subsequently, the governor then automatically starts to move the arm 169 to the right along resistor 170 towards the "balance point" for the No. 4 throttle setting.

Thus, when the throttle stepper switch TSS is first actuated to call for this fourth power condition, the relay MXF becomes picked up, only if the engine speed governor is functioning properly and is drawing movable arm 169 towards its "minimum field" position on resistor 170 so that the diesel engine can come up to speed at minimum load, and causes the throttle control wire TSI and the stepping coil LCC to be deenergized. As pointed out previously, it is necessary that coil LCC (or coil RCC) be deenergized on each stepping operation of throttle stepper switch TSS, before any further stepping of the switch TSS can take place. Obviously, this insures that the engine speed governor of FIG. 3 is operating properly, as the unmanned railway train is being automatically controlled in accordance with the command signals from the wayside.

Assuming the stepping coil LCC has been properly de-energized, by the picking up of relay MXF, when the No. 4 power setting is called for the throttle stepper switch TSS; when the relay MXF is subsequently dropped away to indicate that the movable arm 169 has almost reached the "balance point" for this power setting, the throttle control wire TSI and stepping coil LCC are once again energized to cause the throttle stepper switch TSS to be actuated to its fifth clockwise position (No. 5 power setting called for). In this manner, the setting of stepper switch TSS increases to that corresponding to the highest or No. 8 throttle position.

*Speed control*

As mentioned previously, the reception of the 75, 120 and 180 track code rates call for associated desired train speeds of seven, fifteen and thirty miles-per-hour respectively; and, the axle-driven frequency generator ADFG, the overspeed amplifilter OA and the speed control amplifilter SCA of FIG. 2A, together with the speed filters of FIG. 2B, are utilized to provide an indication of whether or not the actual train speed is within predetermined limits of the demand speed.

More specifically, the axle-driven frequency generator ADFG of FIG. 2A produces an output signal on wires 184 and 185 whose frequency is proportional to the actual speed of the train; i.e. as the train speed increases the output frequency from the generator similarly increases. This output of the frequency generator is fed to the overspeed amplifilter OA of FIG. 2A. With more particular reference to FIG. 7 which shows the details of the overspeed amplifilter OA, this output of the frequency generator ADFG is initially amplified by amplifier circuit 186 and subsequently applied, via emitter follower 187 and along wire 188 (see FIGS. 2A and 2B), as input to one of the speed filters of FIG. 2B, depending upon the received code rate.

More particularly, with a 180 code rate now being received, the output of overspeed amplifilter OA appearing on wire 188 in FIGS. 2A and 2B, is applied through back contact 189 of relay T5P, back contact 190 of relay 75P, back contact 191 of relay 120P and through front contact 192 of code repeater relay 180P to the 33 m.p.h. speed filter. As previously mentioned, these speed filters of FIG. 2B are of the high-pass variety and will only pass the output of the frequency generator ADFG when the actual train speed is above thirty three miles-per-hour, and, as long as the actual speed of the vehicle is below thirty three miles-per-hour, this speed filter is effective to block the analog frequency signal from the generator ADFG.

With reference to FIG. 7, the overspeed amplifilter OA, futheremore includes a checking oscillator 193 which, when rendered effective, generates a frequency high enough to pass through any of the speed filters of FIG. 2B. Thus, when this checking oscillator 193 is rendered effective, as will be described in detail hereinafter, its frequency is passed by whichever speed filter is connected to the output of the overspeed amplifier OA (wire 188 in FIGS. 2A and 2B), so that a return signal is applied to the overspeed amplifilter OA via wire 194 in FIGS. 2A and 2B. More specifically, with a 180 code rate being received, the 33 m.p.h. speed filter of FIG. 2B is connected to this return wire 194 through front contact 195 of relay 180P and back contacts 196, 197 and 198 of relays 120P, 75P and T5P respectively.

This return signal on wire 194 from the speed filter is then supplied (see FIG. 7) through a second emitter follower circuit 199 to an amplifier circuit 200, after which the signal is rectified at rectifier 201 and is amplified at D.C. amplifier 202 to energize wire 203 (see FIGS. 2A, 2B and 2C) for picking up relay D shown in FIGS. 2C and 7. Referring to FIG. 2C, with relay D picked up, its repeater relay DP is also energized over front contact 204 of relay D, and, upon opening its (relay DP) own back contact 205, is effective to deenergize wire 206 and terminate the operation of checking oscillator 193 (see FIG. 7). However, this shutting off of the oscillator 193 then causes relay D to be dropped away, and consequently, the repeater relay DP is also dropped away to turn on the oscillator, which causes relay D to again be picked up. In this manner, the relays D and DP are alternately picked up and released (coded) as long as the actual train speed is less than thirty three miles-per-hour. With the relay D thus being intermittently energized, to alternately open and close its front and back contact 207, the overspeed relay C of FIG. 2C is maintained in a picked up position by a circuit including back contact 207 of relay D and capacitor 207a which is intermittently charged and discharged as the relay D is coded.

With reference to FIG. 7 the overspeed amplifilter OA furthermore includes a circuit arrangement, responsive to the output of the axle-driven frequency generator ADFG, for detecting whether or not the train is in motion. More specifically, this motion detector portion of the overspeed amplifilter OA includes isolation transformer 208, amplifier 209, emitter follower 210, rejection filter 211 which is utilized to render the motion detector responsive only to the output frequency of the frequency generator ADFG, amplifier 212, rectifier 213, D.C. amplifier 214, and motion detector relay MD (see also FIG. 2A). With the motion detector relay MD picked up, to indicate that the train is in motion, its repeater relay MDP of FIG. 2A is also picked up over front contact 215 of relay MD, and furthermore, when the relay MD is dropped away to indicate no motion, its repeater relay MDP is also released.

Referring once again to FIG. 7, the frequency analog of the actual train speed produced by frequency generator ADFG and appearing at the output of emitter follower 210 is also applied along wire 216 as input to the speed control amplifilter SCA (see also FIG. 2A). With more particular reference to FIG. 7, this analog frequency from the frequency generator ADFG and appearing on wire 216 is first amplified by an amplifier circuit including the PNP type transistor 217. From the output of this amplifier circuit of FIG. 7 (the emitter of transistor 217), the frequency analog of actual train speed is supplied along wire 218 (see FIGS. 2A and 2B), through back contacts 219, 220 and 221 of relays T5P, 75P and 120P respectively, and through front contact 222 of relay 180P (with 180 code rate being received) as input to the 30 m.p.h. speed filter. Since this 30 m.p.h. speed filter is of the high-pass type, it will block the signal as long as the train speed is below thirty miles-per-hour. However, when the actual speed analog frequency is high enough to pass through the 30 m.p.h. speed filter; i.e. when the train speed is above thirty miles-per-hour, the signal is returned to the speed control amplifilter SCA through front contact 223 of relay 180P, back contacts 224, 225 and 226 of relays 120P, 75P and T5P respectively, along wire 227 in FIGS. 2A and 2B.

Referring to FIG. 7, the return signal appearing on wire 227 is more specifically; amplified by a two-stage amplifier circuit including transistors 228 and 229; rectified in the output collector circuit of transistor 229 to produce a D.C. voltage proportional to actual train speed; amplified by the D.C. amplifier circuit including transistor 230; and, is applied along wire 231 (between FIGS. 2A, 2B and 2C) to the ±½ m.p.h. micropositioner of FIG. 2C which is utilized, as will be discussed, to register when the actual train speed is within one-half mile-per-hour of the desired or demand speed. Similarly, the rectified signal appearing at the output of transistor 229 in FIG. 7 is furthermore applied to a second D.C. amplifier circuit, including transistor 232, and is applied along wire 233 (between FIGS. 2A, 2B and 2C) to the +2 m.p.h. micropositioner of FIG. 2C which is utilized to register when the actual train speed is above the desired speed by more than two miles-per-hour.

With more particular reference to FIG. 2C, the INCHING, ±½ m.p.h. and +2 m.p.h. micropositioners are sensitive relay type devices each composed of two adjacent windings which have mutual inductive effects upon one another. With reference, more particularly, to the ±½ m.p.h. micropositioner, the D.C. voltage analog of actual train speed (appearing on wire 231) from the speed control amplifilter SCA of FIG. 2A is applied through variable resistor 234 to the right-hand winding of the micropositioner, while the left-hand winding is energized (with a 180 code rate being received) by a circuit including back contacts 235 and 236 of relay TVP and T5P respectively (see FIG. 2B), through the variable resistor 237, front contact 238 of relay 180P along wire 239 between FIGS. 2B and 2C, through variable resistor 240, and to (—).

The variable resistors of FIG. 2B and 240 of FIG. 2C are adjusted to energize the left-hand winding of the ±½ m.p.h. micropositioner with sufficient current to close the associated contact 241 as long as the actual train speed is below twenty-nine and one-half miles-per-hour and this contact 241 opens as the actual train speed increases above this value, due to the increasing mutual inductive effect produced by the right-hand winding of the micropositioner, as the current supplied to this right-hand winding (along wire 231) increases with increasing train speed. Similarly, the variable resistor 234 is also adjusted so that contact 242 of the micropositioner is actuated to its closed position when the D.C. analog output from the speed control amplifilter SCA of FIG. 2A indicates that the actual speed of the train has increased above thirty and one-half miles-per-hour.

The contacts 241 and 242 of the ±½ m.p.h. micropositioner are then utilized to cause the selective energization of relays —½MPHR and +½MPHR respectively of FIG. 2C, whereby the relay —½MPHR is picked up only as long as the actual train speed is below the demand speed by more than one-half mile-per-hour, and, relay +½MPHR is piked up only as long as the actual train speed is above the demand by more than one-half mile-per-hour.

Similarly, the right-hand winding of the +2 m.p.h. micropositioner of FIG. 2C is supplied with a current value dependent upon the D.C. analog signal appearing on wire 233 from the speed control amplifilter SCA of FIG. 2A and the setting of variable resistor 243; while (with a 180 code rate being received), the left-hand winding of the +2 m.p.h. micropositioner is energized by a circuit which includes back contacts 244 and 245 of relays TVP and T5P respectively (see FIG. 2B), variable resistor 246, front contact 247 of code repeater relay 180P, wire 248 in FIGS. 2B and 2C, variable resistor 249, and to (—). These variable resistors 243, 246 and 249 are adjusted so that contact 250 of the micropositioner closes as long as the actual speed of the train is above thirty-two miles-per-hour, with a 180 code rate being received, and the relay +2 MPHR of FIG. 2C is thus picked up with the contact 250 closed and thereby indicates that the actual train speed is above the desired speed by more than two miles-per-hour.

With reference to FIG. 7, the particular train speed at which the +2 m.p.h. and ±½ m.p.h. micropositioners of FIG. 2C operate their associated contacts, as previously discussed, is also dependent upon the setting of potentiometer 252 which directly determines the gain of transistors 228 and 229 of the speed control amplifilter SCA during amplification of the analog signal returning from the selected speed filter, along wire 227 in FIGS. 2A and 2B. Similarly, the potentiometer 253 of FIG. 7 controls the gain of the amplifier circuit including transistor 232 whose output (wire 233) is connected to the +2 m.p.h. micropositioner of FIG. 2C, and thereby, potentiometer 253 more particularly determines at what speed this micropositioner will operate.

In view of the foregoing discussion, it should be clearly evident that the speed comparing micropositioners of FIG. 2C can be very accurately adjusted to operate their associated contacts for providing an indication of the actual train speed relative to the desired or demand speed. As will be discussed in detail hereinafter, the indication provided by these micropositioners directly determines the throttling condition on the unmanned vehicle, and, by adjustment of the speed at which the micropositioners operate, it is possible to maintain the actual train speed within an adjustable desired range of the demand speed.

Recalling now that the step increase throttle control wire TSI of FIGS. 2C and 2D has been energized, and, assuming that the throttle stepper switch TSS has been actuated to the No. 8 power setting wherein control relays EXR, AVR, BVR and CVR are now picked up (see FIG. 4), the locomotive power unit continues to develop its maximum power output until the actual train speed increases to within one-half mile-per-hour of the demand speed; i.e. until the train exceeds twenty nine and one-half miles-per-hour with 180 code rate being received. It should furthermore be noted, with reference to wafer WB of the stepper switch that as soon as the No. 8 power setting is called for, wafer WB is no longer effective to connect contacts 151 and 152 together and thus the stepping coil LCC cannot be energized to further advance the stepper switch in a clockwise direction.

Assuming now that the actual train speed increases above twenty nine and one-half miles-per-hour, the actual speed analog signal applied to the right-hand winding of the ±½ m.p.h. micropositioner of FIG. 2C is now effective to cause the normally closed contact 241 to be opened and thus cause relay —½ MPHR to drop away. Referring to FIG. 2C, this dropping away of relay —½ MPHR then opens the energizing circuit for the step increase control wire TSI, at front contact 178 of this relay, and therefore, the control wire TSI is rendered ineffective to cause clockwise stepping of the stepper switch TSS even though the stepper switch TSS may not have yet reached its maximum or No. 8 power setting.

Subsequently, when the actual speed of the vehicle increases above thirty and one-half miles-per-hour, the signal applied to the right-hand winding of the ±½ m.p.h. micropositioner of FIG. 2C is then sufficient to close contact 242, as previously described, whereby relay +½ MPHR is picked up, to indicate that the actual speed of the train is more than one-half mile-per-hour above the demand speed. With relay +½ MPHR now picked up, the overriding solenoid control relay ORSR of FIG. 2D is now picked up and closes its front contact 254 to energize wire 254a in FIGS. 2D and 3 leading to the "overriding solenoid ORS" in the engine speed governor, by a circuit including front contact 255 of relay +½ MPHR of FIG. 2C, back contact 256 of relay MNFP which indicates that the movable arm 169 on the load regulator resistor 170 of FIG. 2H is not already in the "minimum field" position, wire 257 between FIGS. 2C and 2D, and to (—). As is well known to those skilled in the art, this "overriding solenoid" included in the engine speed governor (see FIG. 3) is effective, when energized, to automatically draw the movable arm 169 of FIG. 2H towards the "minimum field" position on resistor 170 wherein the generator output and the diesel engine are unloaded to decrease the power output from the locomotive.

However, if this decrease in power output fails to properly lower the actual train speed (relay +½MPHR stays up) and the movable arm 169 reaches its extreme left-hand position, as illustrated in FIG. 2H, the relays MNF and MXF of FIG. 2H and repeater relay MNFP of FIG. 2G, are all actuated to their picked up positions, and the step decrease throttle control wire TSD of FIG. 2D would then be energized by a circuit including front contact 173 of the motion detector relay MD of FIG.

2A, wire 174 between FIGS. 2A, 2B and 2C, front contact 258 of relay MNFP, front contact 259 of relay +½ MPHR, wire 260 between FIGS. 2C and 2D, and front contact 261 of relay MXF. With the step decrease wire TSD of FIG. 2D now energized and the throttle stepper switch TSS in its eighth clockwise position, the right-hand stepping coil RCC of FIG. 2D is now energized over a circuit including contacts 262 and 263 of wafer WK and is thus rendered effective to rotate the stepping switch TSS one step in the counterclockwise direction for decreasing the locomotive throttle setting.

At the same time, the relay ORSR of FIG. 2D is deenergized by the opening of back contact 256 of relay MNFP, so that the "overriding solenoid" in the governor no longer holds the load regulator in its "minimum field" position, and the movable arm 169 of FIG. 2H thus begins to move to the right along resistor 170 for loading the diesel engine in the No. 7 throttle setting. However, if the actual train speed is still above thirty and one-half miles-per-hour, after the movable arm 169 has moved far enough to release the relay MNF of FIG. 2H and its repeater relay MNFP (the step decrease control wire TSD and stepping coil RCC are also deenergized), the relay ORSR of FIG. 2D is once again picked up and energizes the governor "overriding solenoid" to again actuate the load regulator towards its "minimum field" setting. As previously pointed out, if the train speed again fails to properly reduce below thirty and one-half miles-per-hour, the subsequent picking up of relay MNFP will once again energize the step decrease control wire TSD and cause the throttle stepper switch TSS to be actuated one more step in the counterclockwise direction to the No. 6 power setting.

This step decrease control wire TSD of FIG. 2D is therefore effective, when energized, to cause the stepping switch TSS to be operated in a counterclockwise direction for decreasing the locomotive throttle setting as long as the relay +½MPHR is picked up to indicate that the train is overspeed and the relay MNFP is picked up to indicate that the load regulator is in the "minimum field" position. In this manner, the locomotive power setting on the automated train is successively decreased until a setting of throttle stepper switch TSS is obtained wherein the governor "overriding solenoid" is, by itself, effective to keep the actual train speed below thirty and one-half miles-per-hour.

Furthermore, if the actual speed of the train should subsequently drop below twenty nine and one-half miles-per-hour, contact 242 of the ±½ m.p.h. micropositioner (see FIG. 2C) will again be closed to pick up relay −½MPHR which is then effective to once again cause energization of step increase control wire TSI of FIG. 2D provided of course that the movable arm 169 of FIG. 2H has moved far enough to the right along resistor 170 to release relay MXF which indicates that the diesel engine is properly loaded for the existing throttle or power setting. As previously discussed, this energization of the control wire TSI causes stepping coil LCC of FIG. 2C to actuate the throttle stepper switch TSS in a clockwise direction to its next higher power setting; and thus, to a condition wherein the load regulator, by itself, can furthermore maintain the actual train speed above twenty nine and one-half miles-per-hour.

If for some reason the actual speed of the vehicle increases above thirty two miles-per-hour, with the 180 code rate being received, relay +2MPHR of FIG. 2C is energized by the closure of contact 250 of the +2 m.p.h. micropositioner, as previously described. With reference to FIG. 2C, this picking up of relay +2MPHR opens its back contact 108 included in the normally closed energizing circuit for relay ASB of FIG. 2H, and thus, if the train exceeds the desired speed by more than two miles-per-hour, a service application of the locomotive and train brakes is called for (in addition to the throttle reduction, previously discussed) by the dropping away of relay ASB which causes magnet valve RMV–L and AMV–L located on the locomotive to be energized, and, its repeater relay ASBP which causes energization of the train brake application magnet valves provided on each of the cars of the train (e.g. see magnet valve AMV–C1 in FIG. 2H).

As soon as this brake application is effective to properly lower the speed of the vehicle below thirty two miles-per-hour, relay +2MPHR is once again deenergized by the opening of contact 250 of the associated micropositioner and thereby closes its back contact 108 in the energizing circuit for relay ASB of FIG. 2H, so that the locomotive and train brakes are then automatically released.

As previously discussed, while the relay ASB is dropped away to call for this service application of the vehicle brakes, the relay AEB is held in a picked up position by a stick circuit including, among other things, front contact 64 of relay ACCKP (see FIG. 2H) which proves that the brake application has been enforced, wire 65 between FIGS. 2H and 2G, front contact 66 of relay BONP which proves that the locomotive brakes are also applied, wire 67 between FIGS. 2G and 2H, and back contact 68 of relay ASB. Therefore, if the vehicle brakes fail to properly apply when called for as the actual train speed exceeds thirty two miles-per-hour, with a 180 code rate received, the relay AEB will be dropped away to enforce an emergency brake application.

Furthermore, with reference to FIGS. 2H, 2G and 2C, it should be noted that whenever relay ASB is picked up, the stick circuit for relay AEB of FIGS. 2H includes wire 264 between FIGS. 2H, 2G and 2C, front contact 265 of overspeed relay C, wire 266 between FIGS. 2C, 2G and 2H, and front contact 68 of relay ASB. Thus, if the relay ASB fails to properly drop away and call for the service brake application and the actual speed of the train then increases above thirty three miles-per-hour, the frequency of the output signal (appearing on wire 188 in FIG. 2A) from the axle-driven frequency generator ADFG of FIG. 2A is effective to pass through the 33 m.p.h. speed filter of FIG. 2B. The relay D of FIG. 2C (as well as its repeater relay DP) will therefore remain steadily energized, even though the checking oscillator 193 of the overspeed amplifilter OA (see FIG. 7) has been rendered ineffective, and therefore, the overspeed relay C is dropped away to open its front contact 265, in the existing stick circuit for relay AEB of FIG. 2H. As previously mentioned, when the relay AEB is dropped away, the emergency brake magnet valve EMV of FIG. 2H is now deenergized and causes the train air brake line to be vented to the atmosphere for causing an emergency application of the vehicle brakes.

With reference to FIG. 2H, it should be noted that capacitor 267 and resistor 268 are connected in multiple with the stick circuit for relay AEB and cause the relay AEB to be somewhat slow releasing when deenergized, for example, by the dropping of overspeed relay C; the failure of the vehicle brakes to properly apply when relay ASB drops away, as previously discussed; the opening of front contact 72 of relay 37½P of FIG. 2B; or the picking up of relay NP–LOP of FIG. 2H. It should furthermore be noted, however, that this time delay provided by capacitor 267 and resistor 268 is not effective to make relay AEB slow releasing when one of the push buttons EPB, ESPB(L) or ESPB(R) of FIG. 2H is depressed to call for an emergency brake application. Once the relay AEB is thus dropped away, it requires another actuation of the RESET push button of FIG. 2H before it can be picked up. For this reason, it is necessary after an emergency brake application for an operator to again board the train and release its emergency brakes.

With reference to FIGS. 2D and 2C, it will be noted that throttle control wire T1H of FIGS. 2C and 2D is energized over back contact 269 of relay AEB whenever an emergency brake application is called for by the dropping away of relay AEB, and insures that the locomotive throttle setting will be properly reduced when an emergency brake application is called for. At the same time, the closure of back contact 270 of relay AEB and the resulting energization of wire 271 between FIGS. 2D and 2C insures that the relay ORSR of FIG. 2D is picked up, to cause the unloading of the generator and the diesel engine, during such overspeed condition.

In a similar manner, while the relay ASB is dropped away to call for a service brake application (if the actual train speed is greater than the demand speed by more than two miles-per-hour), the wire 271 in FIGS. 2D and 2C is energized to pick up relay ORSR for unloading the generator and the diesel engine, over back contact 272 of relay ASB and front contact 273 of relay ACCKP connected in multiple. At the same time, the closing of back contact 274 of relay ASB (see FIGS. 2D), connected in multiple with front contact 259 of relay +½MPHR over wire 275 in FIGS. 2C and 2D, insures that the step decrease wire TSD of FIG. 2D is energized to properly reduce the throttle setting during such a service brake application.

In view of the above discussions, it is seen that the power unit on the automated vehicle is accurately operated to maintain the actual vehicle speed within one-half mile-per-hour of the demand speed being called for from the wayside, and that if overspeed occurs, the brakes of the vehicle are applied, as necessary, to properly reduce the vehicle speed. Furthermore, it should be noted that the operation of the throttle and brakes have been properly interlocked so that, for example, the throttle setting is reduced when a brake application is called for.

Subsequently, if a 120 code rate is now received, calling for a speed reduction from thirty down to fifteen miles-per-hour, the relay ASB of FIG. 2H will first be dropped away to apply the vehicle brakes until the actual speed decreases below seventeen miles-per-hour, at which time the brakes will be automatically released (relay ASB picked up), and, the throttling control apparatus discussed above will then be rendered effective to adjust the power setting of throttle stepper switch TSS of FIGS. 2C and 2D until a setting is obtained wherein the load regulator (controlled by the engine speed governor) is, by itself, effective to maintain the desired speed.

More specifically, when a 120 code rate is received; the —½MPHR relay of FIG. 2C is dropped away to deenergize the step increase control wire TSI of FIG. 2D when the actual speed of the vehicle is above fourteen and one-half miles-per-hour; the relay +½MPHR is picked up to energize the step decrease control wire TSD of FIG. 2D when the actual train speed increases above fifteen and one-half miles-per-hour; relay +2MPHR of FIG. 2C is picked up to call for a service brake application if the actual train speed increases above seventeen miles-per-hour; and, the overspeed relay C of FIG. 2C is de-energized, to call for an emergency brake application if the actual train speed should increase above seventeen and one-half miles-per-hour without a service brake application, as determined by the 17.5 m.p.h. speed filter which is connected to the output (wire 188 in FIGS. 2A and 2B) of the overspeed amplifilter OA when a 120 code rate is received.

Similarly, with a 75 code rate being received to call for a desired speed of seven miles-per-hour; the throttle is increased until the train speed reaches six and one-half miles-per-hour; it is decreased when the train speed reaches seven and one-half miles-per-hour; a service brake application is called for if the actual train speed exceeds nine miles-per-hour; and, an emergency brake application is called for if nine and one-half miles-per-hour should be exceeded without a service brake application.

When a 37½ code rate is received on the automated train, the energizing circuit for relay ASB of FIG. 2H is interrupted, as seen in FIG. 2F, since the relays 75P, 120P, 180P and 270P are now all dropped away to open their associated front contacts; e.g. see front contact 104 of relay 180P. The resulting deenergization of relay ASB and its associated repeater relay ASBP, then causes a service brake application on the train to bring it to a complete stop. At the same time, the existing stick circuit for relay SRCOK of FIG. 2G is also opened, at front contacts 80, 81, and 82 of relay 75P, 120P and 180P respectively in FIG. 2F, so that front contact 107 of relay SRCOK is also opened to insure that the relay ASB is dropped away.

As a result of the dropping away of relay ASB, the step decreases throttle control wire TSD of FIG. 2D is also energized, over back contact 274 of relay ASB, to successively reduce the throttle setting on the unmanned train by energizing stepping coil RCC of FIG. 2D which steps throttle stepper switch TSS in a counterclockwise direction as previously described.

This step decrease control wire TSD is effective to reduce the power setting on the locomotive, until the motion detector relay MD of FIG. 2A drops away to open its front contact 173, at which time the throttle control wire T1H of FIGS. 2C and 2D is energized to cause the throttle stepper switch TSS to "home" to the No. 1 throttle setting wherein relay EXR only of FIG. 2D is picked up by energization from wire 158 in FIGS. 2C and 2D, wire 275a between FIGS. 2C, 2B, and 2A, and front contact 275b of relay MDP. More specifically, the wire T1H is now being energized by a circuit including back contact 113 of relay MD in FIG. 2E, wire 276 between FIGS. 2E, 2F, 2B, and 2C, and back contact 277 of relay SRCOK.

It has been found, in practice, that the relay MD will drop away as the train speed reduces below one mile-per-hour, for example, and consequently, the repeater relay MDP of FIG. 2A is made slow releasing to drop away after the train has had sufficient time to come to a complete stop. As soon as the repeater relay MDP drops away, the throttle control wire IDH is energized to further reduce the throttle setting down to the illustrated IDLE condition by a circuit including back contact 278 of relay MDP, wire 279 in FIGS. 2E, 2F, 2G and 2C, and back contact 280 of relay SRCOK.

With reference to FIG. 2B, it should be noted that during reception of the 37½ code rate; that is, with none of the proceed code relays, T5P, 75P, 120P or 180P being energized, the wires 218 and 227 from the speed control amplifilter SCA of FIG. 2A are disconnected from the speed filters of FIG. 2B, and, that the wires 188 and 194 from the overspeed amplifilter OA of FIG. 2A are connected together by capacitor 280a. This capacitor is utilized to prevent an emergency brake application, if, the automated train is standing with a service brake application, and a subsequent proceed signal is received. More specifically and with reference to FIG. 7, because of capacitor 280a, the output of the checking oscillator 193 is effective to cause the relays D and DP to pulse one another, as previously described, and thereby causes pick up of the overspeed relay C even though the train is standing still. Subsequently, if the relay ASB is picked up in response to a received proceed code, the closed front contact 265 of overspeed relay C prevents the relay AEB from dropping away and thereby prevents an emergency brake application. Furthermore, this capacitor 280a is of such value that it serves as an overspeed filter during operation of the automated vehicle at two miles-per-hour, as will be described.

As previously mentioned, a "no code" condition calls for an emergency brake application on the automated vehicle. More specifically, with no command signal being received, the relays 37½R and 37½P of FIG. 2B will both be dropped away, and, the stick circuit for relay AEB will then be interrupted at front contact 72 of relay 37½P (see FIG. 2F). As previously pointed out, once this relay AEB is dropped away, the resulting emergency brake application can only be released by an operator boarding the vehicle and depressing the RESET push button of FIG. 2H.

*Trouble conditions when underway*

As previously mentioned, various possible trouble conditions are automatically monitored during a proposed starting of the unmanned vehicle, and, the relays SRCOK and SCK of FIG. 2G are utilized to prevent release of the vehicle brakes and operation of the locomotive throttle, if such troubles occur. In addition, apparatus is provided for properly handling the unmanned vehicle if any such trouble arises while the vehicle is underway.

For example, a general trouble relay GT of FIG. 2H, when picked up, indicates a trouble condition has occurred, as will be described, and causes the relay 75P of FIG. 2B to be picked up to call for a demand speed of seven miles-per-hour even though a higher train speed is being called for by a 120 or 180 track code rate. More particularly, the circuit by which the code repeater relay 75P is energized, with trouble occurring, extends from (+) in FIG. 2D, through front contact 84 of relay GT, over wire 281 between FIGS. 2D, 2C and 2B, through either front contact 282 of relay 120R or front contact 283 of relay 180R, depending upon which code rate is being received, and to (−). In this manner, the automated train is controlled to operate at seven miles-per-hour even though a higher train speed is being called for in accordance with advance traffic conditions.

However, it should be pointed out at this time that if, during the time that relay GT is picked up to call for train operation at seven miles-per-hour, a more restrictive command signal is received from the wayside; i.e. a service brake application is called for in accordance with a received 37½ code rate, the train is automatically controlled in accordance with this more restrictive command signal. Thus, with a 37½ code rate being received, the relay ASB of FIG. 2H is deenergized and the locomotive and train brakes are automatically applied.

With reference to FIG. 2H, the general trouble relay GT is provided with a plurality of multiple connected energizing circuits whereby the relay GT can be picked up to call for a reduced train speed if any one of the following troubles occurs: the diesel engine is over-heating, in which condition relay GT is energized from the "hot engine" light normally provided on the diesel-electric type locomotives to indicate that the cooling water temperature is above a predetermined value; front contact 284 of ground relay GRDBP closed which registers that a ground has occurred on the locomotive high voltage system; or, front contact 285 of relay ACCKP and back contact 286 of relay ACK both closed which detects that a brake application is called for but that the trainline wires 49 and 50 are open-circuited. Once this general trouble relay GT is picked up, it is stuck in this position over its front contact 287 and the normally closed TROUBLE RESET push button of FIG. 2H.

A further possible energizing circuit for the relay GT extends from (+) in FIG. 2A, over back contact 215 of the motion detector relay MD, wire 288 between FIGS. 2A, 2B, 2C and 2D, through one of the front contacts of the control relays AVR, BVR, CVR and DVR of FIG. 2G, connected in multiple, which detect that forward throttle has been called for, along wire 289, between FIGS. 2D and 2C, front contact 290 of relay BONP which detects that the brakes are applied, wire 291 between FIGS. 2C, 2G, and 2H, and to (−). This later energizing circuit for the relay GT thus detects the undesirable condition wherein the train is standing with its throttle and brakes simultaneously applied.

In addition to this general trouble relay GT, mentioned above, certain other provisions are made in accordance with the present invention whereby the locomotive throttle setting will be properly controlled if any such troubles occur. For example, if front contact 292 of relay NP–LOP (see FIG. 2D) closes, to indicate failure of the A.C. power system on the locomotive or that the lubricating oil pressure for the diesel engine is not sufficient, the throttle control wire T1H of FIG. 2D is automatically energized for actuating throttle stepper switch TSS to that setting which calls for the No. 1 throttle position. With reference to FIG. 2H, it should be noted that the relay NP–LOP is also provided with a stick circuit including its own front contact 293 and the TROUBLE RESET push button, whereby the NP–LOP will remain in its picked up position after once being energized until the trouble is corrected and the TROUBLE RESET push button is depressed by an operator.

In addition, the front contact 294 of relay GRDBP (see FIG. 2D), when closed to register that a ground has occurred on the locomotive high voltage system, causes energization of the control wire IDH of FIG. 2D whereby the throttle stepper switch TSS is actuated as previously discussed, until the stepper switch TSS calls for the IDLE position of the locomotive throttling apparatus. In more detail, the energization of the control wire IDH of FIG. 2D applies energy to the stepping coil RCC, via contacts 295 and 296 of wafer WL and commutating contact 131, whereby the stepping coil RCC is pulsed so as to step the wafers WA through WL in a counterclockwise direction, until wafer WL reaches its illustrated position wherein the indent 297 on wafer WL is opposite contacts 295, at which time stepping coil RCC can no longer be pulsed and the throttle stepper switch TSS is in position to call for the IDLE power setting on the locomotive; i.e. only control relay PYR is picked up (see FIG. 4).

With reference to FIG. 2H, a warning light circuit is provided whereby the wayside can be informed that trouble has occurred on the automated vehicle, so that proper corrective actions may be taken. More specifically, this WARNING LIGHT in FIG. 2H is located on the vehicle where it can readily be seen from the wayside, and, is illuminated if any of the following occurs: front contact 298 of general trouble relay GT closed; front contact 299 of relay NP–LOP closed; or, back contact 153 of relay AEB closed.

The operator on the wayside, upon observing that the WARNING LIGHT is lit, would then depress one of the emergency stop push-buttons ESPB(L) or ESPB(R) in FIG. 2H, which are located on either side of the locomotive within reach of the operator, to insure that an emergency brake application is called for on the vehicle. When the relay BONP of FIG. 2G is picked up to register that the brakes are applied and relay PYR of FIG. 2D is picked up to register that the throttle stepper switch TSS is in the ILDE power setting; the lights OK(L) and OK(R) in FIG. 2H are illuminated by a circuit including front contact 300 of relay BONP, wire 301 between FIGS. 2G and 2H, front contact 302 of relay PYR and back contact 303 of relay AEB, to provide indication to the operator that it is now permissible to board the automated vehicle and perform the necessary corrective measures needed to clear up the existing trouble conditions.

In addition to the above-mentioned circuits effective to cause proper operation of the locomotive throttle and brakes when certain troubles occur on the automated vehicle, a further protective circuit organization is provided for automatically reducing the generator output if the traction motors of the vehicle are drawing excessive current. More particularly, the meter shunt MS of FIG. 2G is assumed to be connected in series in the main energizing circuit for one of the traction motors provided on the locomotive and has a winding 304 connected across it which is supplied with a current magnitude proportional to the magnitude of current being drawn by the traction motors, and, the contact 305 associated with winding 304 is closed if the current to the traction motors becomes excessive.

In accordance with the closure of this contact 305, the current limiting relay CL of FIG. 2G is picked up by a circuit extending from (+), through the contact 305 and back contact 306 of repeater relay CLP, and to (−). With relay CL thus picked up, the overriding solenoid relay ORSR of FIG. 2D is picked up, to energize the "overriding solenoid ORS" contained in the engine speed governor, by a circuit including front contact 307 of relay CL, wire 308 extending between FIGS. 2G and 2C, and wire 257 extending between FIGS. 2C and 2D. As previously mentioned, each time the relay ORSR is picked up, the "overriding solenoid" of the engine speed governor is energized to cause the movable arm 169 of the load regulator (see FIG. 2H) to move towards its "minimum field" position and the current to the battery field winding BF of the main generator (see FIG. 3) is reduced, to decrease the output of the generator.

This picking up of current limiting relay CL furthermore causes energization of its repeater relay CLP, by a circuit including front contact 309 of relay CL. The subsequent picking up of repeater relay CLP causes deenergization of relay CL, but, because of the adjustable time delay introduced by capacitor 310 and resistors 311 and 312, the relay CL does not immediately drop away. Subsequently, when front contact 309 of relay CL opens, the repeater relay CLP is also deenergized, but, because of the time delay introduced by capacitor 313 and resistors 314 and 315, this repeater relay CLP is also slow releasing. When back contact 306 of relay CLP subsequently closes, the relay CL is once more picked up if the traction motor current is still excessive and the "overriding solenoid" is once again energized to decrease generator output. By properly adjusting resistors 312 and 315, the energizing and deenergizing of the "overriding solenoid" continues until the traction motor current is properly lowered to a more acceptable value.

*Automatic warning*

As previously mentioned, the automated vehicle provided in accordance with the present invention includes the warning bells WBL (FIG. 2E) and WBT (FIG. 2H) to provide an automatic warning to the wayside that the unmanned vehicle is approaching. More specifically, the warning bell WBL of FIG. 2E is actuated if the actual train speed decreases below fifteen miles-per-hour, as will be described, when the unmanned vehicle is travelling in the assumed southbound direction with the locomotive leading; whereas, the tail car warning bell WBT of FIG. 2H is actuated when the train speed decreases below fifteen miles-per-hour and the tail car is leading.

Referring to FIG. 7, the analog frequency output from the axle-driven frequency generator ADFG appears at the emitter terminal of transistor 217 and is subsequently amplified by the amplifying circuit including transistor 316 from which the output is applied to the one-shot multivibrator including transistors 317 and 318 to the output of which the relay 15BR is connected. This relay 15BR is picked up as long as the output frequency from the frequency generator ADFG indicates that the actual train speed is above fifteen miles-per-hour; which speed is determined by the setting of adjustable resistor 319 across an input to the amplifying transistor 316. As previously mentioned, the automated train is assumed here to receive a command signal calling for a train speed of less than fifteen miles-per-hour whenever the vehicle is approaching a wayside location where personnel may be working.

Referring now to FIG. 2A, if the train speed should drop below fifteen miles-per-hour, the relay 15BR is dropped away to close its back contact 320 and thereby actuates the warning bell WBL of FIG. 2E (assuming that the locomotive is leading) by a circuit including wire 321 between FIGS. 2A and 2E, back contact 322 of relay TVR, wire 323 between FIGS. 2D and 2F, front contact 324 of relay SB, wire 325 between FIGS. 2F and 2G, front contact 326 of relay SRCOK, wire 327 between FIGS. 2G and 2F, back contact 328 of relay T4P and wire 329 between FIGS. 2F and 2E. In a similar manner, as long as the vehicle is in motion (front contact 329a of relay MDP closed) with the tail car leading, the warning bell WBT of FIG. 2H is actuated to provide the audible warning to the wayside, when the relay 15BR of FIG. 2A is released.

*Changing direction*

The present invention furthermore provides for automatically changing the direction of travel for the automated vehicle. More specifically, if a 270 code rate is received by the receiver coils RCA of FIG. 2A, code repeater relay 270P of FIG. 2B will be picked up and opens its normally closed contact 24 in the stick circuit for the relay SB of FIG. 2F.

The resulting release of relay SB then opens the existing stick circuit for relay SRCOK of FIG. 2G at front contact 76 of relay SB, so that the relay SRCOK is now released, to drop the relay ASB of FIG. 2H and call for a service application of the vehicle brakes. Subsequently, when the vehicle stops, relay MD releases to open its front contact 113 in FIG. 2E and thereby deenergizes the relay SCK of FIG. 2G.

With the 270 code rate now being received, the relay NB of FIG. 2F is picked up over a circuit including the normally closed contact 22 of push button NBPB, the normally closed contact 23 of SBPB, front contact 24 of relay 270P, back contact 330 of direction transfer relay DT, and back contact 331 of relay SB. When the 270 code rate is subsequently terminated, the relay NB is then provided with a stick circuit including its own front contact 332 and back contact 24 of relay 270P, whereby the relay NB is retained in its picked up position. Furthermore, the dropping away of relay 270P then completes an energizing circuit for the direction transfer relay DT including back contact 333 of relay 270P and front contact 334 of relay NB.

With relay NB now picked up, the code following relay CF of FIG. 2F is now energized in accordance with the command signals being received by the tail car receiver coils RCT of FIG. 2E. More specifically, relay CR of FIG. 2E intermittently closes its front contact 19 at the received code rate and thereby causes energization of the code following relay CF of FIG. 2F, by a circuit including wire 335 between FIGS. 2E and 2F, and front contacts 336 and 337 of relay NB.

As soon as a proper proceed code is received by the receiver coils RCT and the automated train is in proper condition to get underway, the relays SCK and SRCOK of FIG. 2G are both picked up as previously described, and, the relay RER of FIG. 2H is now energized to call for train operation in the reverse or northbound direction. More specifically, the relay RER is picked up over a circuit including front contact 114 of relay A–M, wire 115 of FIGS. 2C and 2B, front contact 338 of relay NB, back contact 339 of relay T6P, wire 340 between FIGS. 2B, 2F and 2E, front contact 341 of relay AE back contacts 342 and 343 of relays BE and MDP respectively, wire 344 between FIGS. 2E, 2F and 2G, front contacts 345 and 346 of relays BONP and SRCOK respectively, wire 347 between FIGS. 2G and 2H, front contact 348 of relay ASB, and front contact 349 of relay ACCKP. With relay RER now picked up, the relay FOR is dropped away to complete a stick circuit for relay RER including back contact 350 of relay FOR and front contact 351 of relay RER. This picking up of relay RER now causes energization of wire RE of FIG. 2D which causes the traction motors of the vehicle to be connected for driving the train in the reverse direction.

With reference to FIG. 2E, it should be noted that contacts 119 and 341 of relay AE and contacts 120 and 342 of relay BE are provided in the energizing circuits for relays FOR and RER of FIG. 2H, to cause these relays FOR and RER to be properly controlled in accordance with the particular end of the locomotive that is connected to the trailing cars of the train.

Control by modulated carrier frequency

The railway vehicle equipped in accordance with the present invention may also be operated by modulated carrier frequency information distinctive of the desired operation. Thus in the illustrated embodiment of the present invention, it is assumed that certain command information may be communicated from the wayside to the vehicle in the form of a tone modulated carrier frequency, for example, applied to suitable wayside loop circuits disposed along the track rails in an inductive relationship with the train carried receiving coils. The particular desired train operations associated with the various tone combinations modulating the carrier frequency have been previously set forth in tabulated form and will not be repeated here. However, it should be pointed out at this time that during reception of the tone modulated carrier frequency, a 37½ track code rate will also be simultaneously applied to the rails over which the vehicle is traveling so as to provide for continuously detecting broken track rails or the like.

More specifically, the tone modulated carrier frequency being received on the vehicle, for example, by the receiver coils RCA of FIG. 2A, is applied along cable 17 from tuner TU1 as input to a suitable carrier amplifier CA, where the carrier frequency information is amplified. As long as carrier frequency is present, the relay COFF of FIG. 2A is picked up by a circuit including wire 352 which is assumed to be energized from the carrier amplifier CA, back contacts 353 and 354 of relays 180P and 120P respectively, wire 355 between FIGS. 2B and 2A, and to (—).

Provided the relay COFF is picked up, the carrier frequency information is then applied, over front contact 356 of relay COFF, as input to a suitable audio amplifier AA which demodulates the carrier frequency information and causes pick up of the tone relays T4R, T5R and T6R of FIG. 2A in accordance with the particular tones modulating the carrier frequency. As long as the 37½ track code rate is also being received, this received carrier frequency information is also registered on the tone repeater relays T4P, T5P and T6P by a circuit including front contact 357 of relay 37½ P, wire 358 and the closed front contacts of the tone relays T4R, T5R and T6R, depending upon the received tone information. It should be noted in FIG. 2B, that a circuit interlock is provided so that relays T4P and T6P cannot both be picked up at the same time.

Assuming now that the automated vehicle has previously been travelling in the southbound direction, and, that a modulated carrier frequency is received including assumed tones T5 and T6 which cause pick up of relay T5R and T6R of FIG. 2A, the train is then called to continue in the forward direction at two miles-per-hour. More specifically, with the relay T5P picked up, the 2 m.p.h. speed filter of FIG. 2B is connected to the speed control amplifier SCA of FIG. 2A over front contacts 219 and 226 of relay T5P; while the overspeed amplifilter OA (see FIG. 2A) is connected over wire 188 and 194 in FIGS. 2A and 2B and front contacts 189 and 198 of relay T5P, to the capacitor 280a which is utilized as an overspeed filter during reception of a two miles-per-hour command signal; i.e. the value of capacitor 280a is selected so that it prevents the analog frequency signal on wire 188 from returning to the overspeed amplifilter OA of FIG. 2A, via wire 194, until the actual train speed is above four and one-half miles-per-hour. Furthermore, the left-hand windings of the ±½ m.p.h. and the +2 m.p.h. micropositioners of FIG. 2C are now supplied with predetermined current values, determined by the setting of adjustable resistors 359 and 360 respectively of FIG. 2B, in accordance with which the locomotive throttling apparatus is operated as previously described, to control the automated train speed at two miles-per-hour.

It has been observed, in practice, that it is sometimes necessary to cause a partial brake application on the train in order to realize train operation at such a low speed as two miles-per-hour. To provide this partial braking, the relay IS of FIG. 2G is picked up, when a two miles-per-hour demand speed is called for, by a circuit including front contact 361 of relay T5P (see FIG. 2F), front contact 362 of relay T6P, front contact 363 of relay 37½ P, front contact 364 of relay SB, and wire 365 between FIGS. 2F and 2G. Once the relay IS is picked up, it is then stuck in its picked up position until a demand speed other than two miles-per-hour is called for, by a stick circuit including its own front contact 366, wire 367 between FIGS. 2G and 2F, back contacts 368, 369 and 370 of relays 180P, 120P and 75P respectively, and back contact 371 of relay TVP. This picking up of relay IS then picks up its repeater relay ISP, over front contact 372 of relay IS, so as to close front contacts 373 and 374 and energize trainline wires 375 and 376 in FIGS. 2G and 2H connected to certain brake control magnet valves (e.g. magnet valve IMV–C1) provided on each car of the train which call for a partial application of the vehicle brakes.

With reference to FIG. 2H, the trainline wires 375 and 376, after being connected to this partial brake control magnet valve for the last car of the train, are connected together by a resistor 376a, while these same trainline wires 375 and 376 (see FIG. 2G) have a similar resistor 376b connected across them at a circuit location prior to where the trainline wires are connected to the partial brake magnet valve IMV–C1 on the first car of the train. A relay ICK in FIG. 2G is then deenergized if equal potentials are applied to the opposite sides of its windings; i.e. if the trainline wires 375 and 376 are not open circuited throughout the entire length of the train. Thus, the relay ICK provides a check that these trainline wires are intact, and, if the relay ICK is picked up, to register that one of these trainline wires is open circuited, the general trouble relay GT of FIG. 2H is picked up to illuminate the WARNING LIGHT of FIG. 2H, over a circuit including front contact 377 of relay IS, front contact 378 of relay ICK, and wire 291 which extends between FIGS. 2G and 2H.

During the reception of this two miles-per-hour command signal, the relay SRCOK is provided with an alternate stick circuit including the normally closed STOP push button of FIG. 2F, back contact 379 of relay TVP, front contact 380 of relay T5P, front contact 381 of relay 37½P, front contact 382 of relay T6P, and wire 79 which extends, as previously described, to the relay SRCOK. Furthermore, during this reception of the two miles-per-hour command signal, the energizing circuit for relay ASB of FIG. 2H is now shifted and includes front contact 383 of relay T5P (see FIG. 2E), front contact 384 of relay T6P, front contact 105 of relay 37½P, and wire 106 in the previously described energizing circuit for the relay ASB.

During this reception of the two miles-per-hour commond signal, the throttle control wire T3H of FIGS. 2C and 2D is furthermore energized to call for "homing" of the throttle stepper switch TSS to the No. 3 throttle position, by a circuit including front contact 166 of relay SRCOK in FIG. 2G, back contact 385 of relay +½MPHR, wire 386 between FIGS. 2G and 2F, front contact 387 of relay T5P, and wire 168, previously described as being in the energizing circuit for the control wire T3H. The throttle stepper switch TSS is thus "homed" to that position associated with the No. 3 throttle setting, during two miles-per-hour operation, after which time the stepper switch will then step up or step down to maintain the two miles-per-hour speed as has been previously described for other speeds.

Assuming now that the unmanned train is standing, in condition for southbound movement (relay FOR of FIG. 2H picked up), the operation of the train will now be discussed, assuming that a modulated carrier frequency signal is received, including the tones T4 and T5 which cause pick up T5P and T4P of FIG. 2B, and calls for reverse operation of the automatic vehicle at two miles-per-hour. Assuming that the relays SRCOK and SCK of FIG. 2G have both been properly picked up to register that the automated train is in proper condition to proceed in accordance with this new signal, and, that the motion detector repeater relay MDP of FIG. 2A is dropped away to close its back contact 343 in FIG. 2E, the reverse relay RER of FIG. 2H is picked up by a circuit including front contact 114 of relay A–M in FIG. 2C, wire 115 between FIGS. 2C and 2B, front contact 116 of relay SB, front contact 388 of relay T4P, back contact 339 of relay T6P, wire 340 between FIGS. 2B, 2F and 2E, and along the previously described energizing circuit for the relay RER.

With reference to FIG. 2F, it should be recalled that during a normal reversal of the train direction, in accordance with the reception of a 270 code rate, the relay SRCOK of FIG. 2G is dropped away as soon as the reversal of the relays SB and NB is initiated by the dropping of that relay which was previously picked up to register the former desired direction of travel; i.e. during the time interval wherein both the relays SB and NB are dropped away, the stick circuit for relay SRCOK is interrupted long enough to cause the relay SRCOK to drop away. However, during certain operations of the unmanned railway train provided in accordance with the present invention, it may be desirable to initiate a reversal of the train carried apparatus without immediately dropping the relay SRCOK.

One example of where such operation may be required is during the movement of the automated vehicle into an area where code communication means are undesirable on the wayside, in advance of the vehicle. Therefore, it is required as the vehicle approaches this location, to reverse the receiving ends of the vehicle, so that the automated train may be temporarily controlled by command information transmitted to the trailing end of the train, while at the same time keeping the vehicle conditioned for the original direction of travel.

With reference to FIG. 2F, an alternate stick circuit is thus provided for the relay SRCOK of FIG. 2G, to permit this relay to be maintained in its picked up position while the command signal receiving end of the train is being reversed. More specifically, this alternate stick circuit for the relay SRCOK includes front contacts 389, 390, 391 and 392 of relays 270P, DT, T4P and 75P respectively, which alternate stick circuit is connected in multiple with front contact 76 of relay SB, and, thereby permits the relay SRCOK to be retained in its picked up position during this reversal on the receiving ends of the vehicle.

In the illustrated embodiment of the present invention, this alternate stick circuit for the relay SRCOK is assumed to be utilized when the automated vehicle is approaching the wayside area at which the receiver reversal is necessary, with the relay NB picked up (tail car leading) and the vehicle receiving a 75 code rate via the tail car receiver coils RCT of FIG. 2E. At a predetermined point in approach to the wayside area, this 75 code rate is removed and a 270 track code rate is communicated to the tail car receiver coils RCT to initiate the reversal of the relays NB and SB as previously described. However, the relay 75P of FIG. 2B is sufficiently slow releasing, after the receiver coils RCT no longer receive the 75 code rate, to remain in its picked up position during the reversal of the relays NB and SB. At the same time that the 270 code rate is communicated to the tail car, a 75 track code rate and tone T4 are simultaneously communicated to the locomotive receiver coils RCA, but, since the relay NB is still picked up, this 75 code rate has no effect on the vehicle; whereas, the tone T4 is effective to cause tone T4P to be picked up. With the relays 75P, T4P and 270P now picked up, the relay DT of FIG. 2F will be stuck in its picked up position; relay NB will be dropped away, and, the relay SB will be picked up to render the locomotive receiver coils RCA effective to actuate the code following relay CF of FIG. 2F. However, it will be noted that because of this alternate stick circuit now being provided for relay SRCOK, the relay SRCOK does not release during the reversal of relays NB and SB. Subsequenty, the 75 code rate and tone T4 being transmitted towards the locomotive end of the train and received by the receiver coils RCA thus maintain the vehicle at its former speed of seven miles-per-hour in the north-bound direction, while at the same time keeping the relay SRCOK picked up after relay 270P drops away.

When the vehicle reaches its desired stopping point, a stop code would then be communicated to the locomotive receiver coils RCA, at which time the relay SRCOK is permitted to drop away, and, after the vehicle comes to a complete stop (as detected by the dropping away of relay MDP of FIG. 2A) the relay FOR of FIG. 2H would then be picked up over the previously described pick up circuit including front contact 116 of relay SB, so that the train is now ready for travel in the opposite or southbound direction when a new proceed code is received on the train.

*Control at inching speed*

It has been previously pointed out how the automated train, controlled in accordance with the present invention, can be made to automatically operate at desired speeds of two, seven, fifteen and thirty miles-per-hour, in accordance with command signals communicated from the wayside to the vehicle in the form of a tone modulated carrier frequency or a coded track rail current. In addition, the control system of the present invention furthermore provides for properly and automatically controlling such unmanned vehicle to operate at very low or inching speeds, for example, within the range of one-eighth to three-eighths of a mile-per-hour. With reference to the accompanying drawings, two different methods are illustrated for providing this inching speed control, and, it should be understood at this time that normally, in practice, only one of the illustrated methods would be employed at a given time. In this disclosure, however, both methods are illustrated to more clearly define the present invention.

The desired inching speed is registered on the vehicle in accordance with the picking of relay TVR of FIG. 2A, when the received carrier frequency communicated from the wayside to the vehicle (over suitable communication means such as a loop circuit, etc.) is modulated by a variable frequency tone TV, and, it is assumed here that the frequency of this tone is variable and is being controlled on the wayside to be indicative of the desired inching speed which varies between one-eighth and three-eighths miles-per-hour.

The picking up of tone relay TVR, as will be described, indicates that inching speed is desired, and furthermore causes pick up of its repeated relay TVP of FIG. 2B over the obvious circuit including front contact 357 of relay 37½P which registers track rails are not broken as previously pointed out, wire 358 between FIGS. 2B and 2A, front contact 393 of relay TVR, and along wire 394 between FIGS. 2A and 2B. In accordance with the picking up of relay TVP, its back contacts 235 and 244 are furthermore both opened and thereby cause deenergization of the left-hand windings of the ±½ m.p.h. and +2 m.p.h. micropositioners of FIG. 2C, while the right-hand windings of these micropositioners are also deenergized since the speed control amplifilter SCA of FIG. 2A is inoperative without a speed filter connected to its output (see FIG. 2B).

In the illustrated embodiment, it is assumed that the automated train would normally be brought to a complete stop, so as to drop the motion detector repeater relay MDP of FIG. 2A, before an inching speed command signal (tone TV along with either tone T4 or tone T6) is communicated from the wayside to the vehicle. Assuming that the relays TV and TVP now both picked up, and, that the vehicle is standing with the locomotive and train brakes applied, the variable tone stick relay TVS of FIG. 2C is then picked up and later stuck by a circuit including front contact 395 of relay BONP which detects that the locomotive brakes are applied, wire 396 between FIGS. 2C and 2D, back contact 397 of relay ASB which detects that a vehicle brake application has been called for, wire 398 between FIGS. 2D, 2C, 2B and 2A, back contact 399 of relay MDP which detects that the vehicle has completely stopped, wire 400 between FIGS 2A and 2B, and through front contact 401 of relay TVP. Once the relay TVS has been picked up, the relays SCK and SRCOK of FIG. 2F are picked up (they were released previously when a stop code was received) if the train is in proper condtion to proceed at inching speed, and, the relay ASB of FIG. 2H is subsequently reenergized so as to call for a release of the locomotive and train brakes, as previously described.

More particularly, the relay SCK is picked up by a circuit which includes the normally closed contact of the STOP push button of FIG. 2F, front contact 379 of repeater relay TVP, wire 402 between FIGS. 2F and 2G, front contact 403 of relay TVS, wire 404 between FIGS. 2G and 2F front contact 381 of relay 37½P, front contact 382 of repeater relay T6P (assuming that the vehicle is to inch with the locomotive leading), wire 79 between FIGS. 2F, 2G and 2H, front contact 78 of relay AEB, wire 77 between FIGS. 2H, 2G and 2F, front contact 76 of relay SB, wire 75 extending between FIGS. 2F and 2G, and back contact 74 of relay SRCOK. After the relay SCK is picked up, it is thereafter retained in its picked up position by a stick circuit including its own front contact 111 and front contact 405 of relay TVS, whereby this relay is stuck up as long as inching speed is called for.

With front contact 91 of relay SCK now closed, the relay SRCOK is then picked up, over the previously described energizing circuit for this relay, provided that the automated train is in proper condition to proceed in accordance with the inching speed comamnd now being received from the wayside. Furthermore, once the relay SRCOK assumes its picked up position, it is then maintained in this position by a stick circuit which includes its own front contact 74 and that circuit which was previously utilized to cause pick up of the relay SCK.

Assuming that the vehicle is in proper condition to proceed with the inching speed operation; i.e. relays SCK and SRCOK have been properly picked up, the relay ASB of FIG. 2H is now picked up, to release the vehicle brakes, by a circuit which extends from (+) in FIG. 2G and includes front contact 406 or relay TVS, wire 407 between FIGS. 2G and 2F, front contact 384 of relay T6P, front contact 105 of relay 37½P, wire 106 between FIGS. 2F and 2G, front contact 107 of relay SRCOK, back contact 108 of relay +2MPHR, wire 109 between FIGS. 2G and 2H, and front contact 110 of relay REMS.

With reference to FIGS. 2C and 2D, as soon as the relay ASB picks up, the throttle control wire T3H of FIGS. 2C and 2D is now energized from wire 140 in FIG. 2C, over back contact 141 of relay BONP, wire 142 between FIGS. 2C and 2D, front contacts 143 and 144 of relays ASB and AEB respectively, and back contact 145 of relay GRDBP, so as to energize contact 146 of wafer WC of the throttle stepper switch TSS and subsequently wire 147 in FIGS. 2C and 2B. It will be noted that with front contact 148 of relay TVP closed, the wafer WA of the throttle stepper switch TSS is now energized at contact 408, instead of at contact 149, so that the stepping coil LCC of the stepper switch can only actuate the wafers WA through WL for two clockwise steps from the illustrated IDLE position; the stepper switch TSS is "homed" to the No. 2 power position in accordance with the inching speed command now being communicated to the vehicle.

Assuming that the throttle stepper switch TSS has been actuated, as described above, to call for the No. 2 throttle position, the train is controlled to the inching speed being called for by the variable tone TV communicated from the wayside by selectively energizing the relay ORSR of FIG. 2D, and consequently the "overriding solenoid ORS" contained in the engine speed governor to selectively move the adjustable arm 169 on the load regulator resistor 170 (see FIG. 2H).

As previously mentioned, two methods are illustrated in the accompanying drawings for properly and automatically operating the unmanned railway vehicle at very low or inching speeds. More particularly, the first of the methods utilizes the inching discriminator ID of FIG. 2A and the inching micropositioner of FIG. 2C for selectively energizing the relay ORSR of FIG. 2D and consequently the "overriding solenoid ORS" in the engine speed governor; whereas, the second method of inching speed control utilizes the inching speed control unit ISC of FIG. 2A including the relay TVOS, the inching discriminator ID, and the relays CL and CLP of FIG. 2G, to selectively energize the relay ORSR of FIG. 2D, for providing the desired inching speed control.

The first of these methods to be discussed in detail will be that which utilizes the inching discriminator ID and the inching micropositioner of FIG. 2C, and therefore, since only one method of inching speed control would be utilized at a given time, it will be assumed that the circuit is closed at the point FF in FIG. 2C, and that the alternate method including the inching speed control unit ISC of FIG. 2A is rendered ineffective to control the governor "overriding solenoid," for example, by opening the circuit at the point labelled XX in either FIG. 2A or FIG. 2E. Furthermore, for reasons to be explained hereinafter, it will also be assumed that the circuits at points YY in FIG. 2F are now also open-circuited.

With reference to FIG. 2A, the audio tones after being amplified at audio amplifier AA are more particularly supplied to the inching discriminator ID over wire 409. Referring to FIG. 6, this audio input signal, from the amplifier AA is then applied to a low pass filter 410 wherein all but the inching tone frequency TV are blocked. The tone frequency TV proportional to the desired inching speed is then amplified at amplifier 411 and is coupled to a Schmitt trigger circuit 412 which provides as output a series of square wave pulses at the frequency of tone TV. This square wave train is then further amplified at amplifier 413 and is then applied to an averaging circuit 414 which produces a predetermined D.C. voltage whenever the inching tone TV is received. This averaging circuit 414 controls a Schmitt trigger circuit 415 and causes the inching speed relay TVR to be picked up, over wire 416, as long as the wayside is calling for inching speed on the automated train.

The square wave output of amplifier 413 is furthermore supplied as input to a differentiator 417 which provides as output a train of alternate positive and negative going voltage pulses. These pulses are then utilized for triggering a one-shot multivibrator 418 whose output is a series of equal energy pulses, one pulse of which is produced for each cycle of the variable tone TV, received from the wayside; i.e. the average power output of the one-shot multivibrator 418 is proportional to the desired inching speed. These equal energy pulses from the one-shot multivibrator 418 are then coupled, through an emitter follower circuit 419, as input to an averaging circuit 420 which produces, as output, a D.C. voltage proportional to the frequency of tone TV and the desired inching speed.

This D.C. voltage proportional to the desired inching speed is then applied through an impedance matching circuit 421 to one side of the left-hand winding of the inching micropositioner shown in FIGS. 6 and 2C, along wire 422 in FIGS. 2A, 2B and 2C; whereas, the other end of the left-hand winding of the micropositioner is connected to a predetermined voltage level at potentiometer 423 in FIG. 6, through front contact 424 of the relay TVP (see FIG. 2B), and along wires 425 and 426 in FIGS. 2A, 2B and 2C. The left-hand winding of the inching micropositioner, of FIG. 2C is thus supplied with current whose magnitude is proportional to the desired inching speed.

With reference to FIGS. 2C, 3 and 6, the right-hand winding of the inching speed micropositioner is supplied, along wires 427 and 428, with a current value proportional to the voltage drop across the battery field winding BF of the locomotive main generator. This voltage drop across the battery field winding BF of the main generator is obviously dependent upon the position of the load regulator arm 169; i.e. for a given throttle position, as the arm 169 moves to the right, as viewed in FIG. 3, along the load regulator resistor 170, the voltage drop across the battery field winding BF increases proportionately and is thus a measure of the actual speed of the train.

Referring once again to FIG. 2C, it can thus be said that the left-hand winding of the inching micropositioner is supplied with a current whose magnitude is proportional to the desired inching speed, while the right-hand winding of the inching micropositioner is supplied with a current whose magnitude is proportional to the actual train speed. This inching micropositioner is then effective to close its associated contact 429 whenever the actual speed of the train is above the desired inching speed. Thus, with the throttle in the No. 2 power position, as movable arm 169 in FIG. 2H works towards the "balance point" for this throttle setting, a point will be reached where the actual speed of the train increases above the desired inching speed, and the overriding solenoid relay ORSR of FIG. 2D is picked up, over wire 257, and energizes the governor "overriding solenoid" to draw the movable arm 169 towards its "minimum field" position.

With reference to FIG. 3, it will be noted that as the movable arm 169 is drawn towards the "minimum field" position on resistor 170, the voltage drop across the battery field winding BF decreases proportionately, and therefore, the right-hand winding of the inching micropositioner of FIG. 2C is supplied with a smaller current value. As soon as this decreasing current indicates that the actual speed of the train has decreased below the desired inching speed, contact 429 of the micropositioner will again open and cause the overriding solenoid control relay ORSR of FIG. 2D to be dropped away which in turn deenergizes the governor "overriding solenoid," and permits the load regulator arm 169 to again move towards its "balance position," for the given throttle setting, until the desired inching speed is again exceeded. In this manner, it is apparent that the train can be accurately controlled to operate at the inching speed being called for by the variable frequency tone TV being communicated to the vehicle.

As previously mentioned, two methods of providing inching speed control are illustrated in the drawings, and a more detailed discussion of the second inching speed control method will now be set forth. More specifically, during use of the second method of inching speed control, the inching micropositioner of FIG. 2C will be rendered ineffective to control the train speed by disconnecting the circuit, for example, at the point designated FF in FIG. 2C; whereas, the second method of inching speed control will be rendered effective by closing the circuit at the point labeled XX in FIGS. 2A and 2E. As previously mentioned, the second method of inching speed control utilizes the inching discriminator ID, the inching speed control unit ISC including relay TVOS of FIG. 2A, and the relays CL and CLP of FIG. 2G.

More particularly, the inching speed control unit ISC of FIG. 2A is supplied with the D.C. voltage analog of the desired inching speed (from the inching discriminator ID) along wire 430; while a second input, from the axle-driven frequency generator ADFG, is also supplied to the inching speed control unit ISC over wire 431. Referring to FIG. 6, this frequency analog of the actual train speed is then amplified at amplifier 432 and is converted into a series of square waves by shaper circuit 43.

The output of the shaper circuit 433 is then differentiated at differentiator 434 so as to produce a series of alternate positive and negative going voltage pulses. These voltage pulses are utilized to trigger a reset one-shot multivibrator circuit 435 which produces, at its output, a series of voltage pulses; one such pulse being produced by the multivibrator 435 for each cycle of the analog frequency of actual train speed, appearing on wire 431.

The output pulses from the reset one-shot multivibrator 435 are then supplied to a differentiator 436 having a diode 437 connected in its output circuit, whereby the positive output pulses from the differentiator 436 are supplied as one input to an output flip-flop circuit 438 which is constructed to pick up the overspeed relay TVOS if only these positive pulses from the reset multivibrator 435 are present at its input.

However, the output pulses from the reset one-shot multivibrator 435 are also supplied to a ramp reset circuit 439 which is effective, upon receiving a reset pulse from multivibrator 435, to reset the ramp generator circuit 440; i.e. the ramp generator circuit 440 includes a charging circuit which continually attempts to charge to a predetermined voltage level, but, which is reset each time a pulse is produced by multivibrator 435. In this manner, the output from the ramp generator 440 is a series of saw tooth pulses whose magnitude is directly proportional to the time between the reset pulses from multivibrator 435 and therefore also proportional upon the actual speed of the train.

These saw tooth output pulses from ramp generator 440 are then compared, on a magnitude basis, with the D.C. voltage proportional to the desired inching speed (appearing on wire 430) at comparator 441 which produces, at its output, a series of clamped saw tooth pulses, as long as the actual speed of the vehicle is less than the desired inching speed. These clamped saw tooth pulses from the comparator 441 are then differentiated at differentiator 442 to produce a series of positive voltage pulses which are inverted by the underspeed sensor circuit 443 into a series of negative going voltage pulses which are then amplified at the underspeed pulse amplifier 444 and supplied as a second input to the output flip-flop circuit 438. Thus, these underspeed pulses are supplied to the output flip-flop 438 only while the train is below the desired inching speed.

As previously mentioned, the output flip-flop circuit 438 is conditioned so that if only the pulses from multivibrator 435 are present at its input, the overspeed relay TVOS will be picked up over wire 445 (see FIG. 2A). However, as long as the underspeed pulses are being produced by the underspeed sensor 443; i.e. the train is underspeed, the output flip-flop circuit 438 is prevented from picking up the overspeed relay TVOS. In this manner, whether or not relay TVOS is picked up is an indication of whether or not the actual train speed is above or below the desired inching speed.

With reference to FIG. 2E, front contact 446 of overspeed relay TVOS, upon closing, completes an energizing circuit for the relay CL of FIG. 2G, extending along wire 447 between FIGS. 2E, 2F and 2G, and through back contact 306 of the repeater relay CLP. As mentioned previously, the picking up of relay CL closes its front contact 307 and thereby energizes wires 308 and 257 in FIGS. 2G, 2C and 2D, for energizing the overriding solenoid control relay ORSR of FIG. 2D which causes subsequent energization of the governor "overriding solenoid ORS," and the movable arm 169 of the load regulator is drawn towards its "minimum field" position so as to reduce the generator output to the traction motors and therefore the train's actual speed.

This picking up of relay CL furthermore closes its front contact 309 and energizes the relay CLP which when picked up opens its back contact 306 and deenergizes relay CL, as previously described, at which time the "overriding solenoid" is deenergize to permit arm 169 of the load regulator to move again towards the "balance point" in the second throttle position. Thus, relays CL and CLP are alternately picked up and released while the automated train is above the desired inching speed, and cause the selective energization of the relay ORSR of FIG. 2D and consequently the governor "overriding solenoid," whereby the load regulator of FIG. 2H is adjusted to maintain the actual train speed at the desired inching speed being called for from the wayside.

With reference to FIG. 6, a motion detector circuit 448 is also included in the inching speed control unit ISC and it is utilized to make sure that the output flip-flop circuit 438 and the overspeed relay TVOS are returned to their normal underspeed conditions, in the event that the train inadvertently stops, after having its power reduced, as may occur during operation at such low speeds as one-eighth to three-eighths miles-per-hour. More particularly, the motion detector 448 in the inching speed control unit determines whether or not the vehicle is in motion by detecting if output pulses are being produced at the output of the shaper circuit 433, and, if the vehicle stops, the motion detector 448 causes the output flip-flop circuit 438 to be actuated to that condition wherein relay TVOS is dropped away.

With reference to FIG. 2E, it should be noted that back contact 322 of relay TVR is connected in series in the actuating circuits to the warning bells WBL of FIG. 2E and WBT of FIG. 2H, whereby these warning bells are rendered inoperative during control of the automated train at inching speed. Furthermore, during inching speed control, back contact 449 of relay TVS (see FIG. 2C) is opened and renders the checking oscillator 193 in the overspeed amplifilter OA of FIG. 2A inoperative, whereby the overspeed relay C (in FIG. 2C) remains in its dropped away position.

*Partial braking during inching speed control*

Because of the relatively low speeds involved during inching speed control, it may be necessary to cause a partial brake application on the locomotive whenever inching speed is called for from the wayside. More specifically, it will now be assumed that the circuit points YY in FIG. 2F are closed to provide an alternate energizing circuit for the locomotive brake control magnet valves RMV–L and AMV–L of FIG. 2H, and furthermore that the jumper wire 450 in FIG. 2H is now removed, whereby both of these locomotive brake control magnet valves RMV–L and AMV–L are initially energized when inching speed is called for, by a circuit extending from (+) in FIG. 2F, through front contact 451 of relay TVP, wire 452 between FIGS. 2F, 2G, and 2H, wire 453 between FIGS. 2H, 2G and 2F, front contact 454 of relay TVP and to (−). With reference to FIG. 2H, it should be noted that the magnet valve RMV–L is directly energized over this circuit; whereas, magnet valve AMV–L receives its energization through pressure switch LPS4 which is actuated in accordance with the braking pressure supplied to the locomotive brake cylinders and which opens its associated contact after a predetermined amount of braking is occurring on the locomotive.

Thus, during inching speed control, the magnet valves RMV–L and AMV–L are both initially energized until the pressure switch LPS4 is opened to indicate a partial brake application, at which time magnet valve AMV–L is deenergized so that the locomotive brakes remain in this partially applied condition as long as inching speed is called for from the wayside. However, if a stop control signal is subsequently received so as to drop relay ASB of FIG. 2H, the pressure switch LPS4 of FIG. 2H is bypassed by a circuit including wire 455 between FIGS. 2H and 2G, back contact 456 of relay TVS, and wire 452 between FIGS. 2G and 2H, so that a full service brake application will be enforced.

Since the locomotive brakes may be partially applied during inching speed control, front contacts 457 and 458 of relay TVS (see FIG. 2C) are connected in multiple respectively with back contacts 141 and 157 of relay BONP. More particularly, since this partial brake application would cause pressure switch LPS1 of FIG. 2H to close its associate dcontact and thereby energize relay BONP, front contacts 457 and 458 of relay TVS insures that the throttle control wire T3H and the wire 158 in FIGS. 2C and 2D receive proper energization during inching speed control to permit proper operation of the locomotive throtle stepper switch TSS.

*Automatic to manual conversion*

Assuming now that a 37½ code rate is being received on the automated train, an operator on the wayside initiates a conversion of the vehicle back to manual operating condition by depressing one of the emergency stop push buttons ESPB(L) or ESPB(R) located on either side of the locomotive. With reference to FIG. 2H, this causes the relay AEB to be released and deenergizes magnet valve EMV which vents the train brake line and causes an emergency application of the train brakes. The operator, upon observing that one of the lights OK(L) or OK(R) of FIG. 2H is lit, would then climb into the cab of the locomotive and depress the MAN push button of FIG. 2D which causes dropaway of the automation relay A–M of FIG. 2C and subsequent pick up of the relay MER. This relay MER is somewhat slow in picking up, to insure that an emergency brake application has been enforced, and subsequently closes its front contacts 38 and 41 to energize wires 39 and 40 leading to the emergency magnet valve EMV of FIG. 2H whereby this magnet valve is reenergized to close the train brake line.

The dropping away of relay A–M furthermore closes its back contact 42 in FIG. 2G which causes pick up of the relay ASB and subsequent deenergization of the brake control magnet valves provided on the locomotive and cars on the train. With all of the brake control magnet valves of FIG. 2H now properly conditioned, the train brakes can be manually released by the operator and the vehicle is now in conditon for manual operation in accordance with the manual throttle lever.

Having thus described a railway train control system, as one specified embodiment of the present invention, it is desired to be understood that the form is selected to facilitate in the disclosure of the invention rather than to limit the number of forms which it may assume; and, it is to be further understood that various modifications, adaptations and alterations may be applied to the specific forms shown to meet the requirements of practice, without in any manner departing from the spirit or scope of the present invention.

What we claim is:

1. The combination with a variable speed power unit equipped with governor means which adjusts the loading on said power unit each time the speed setting on said power unit is changed to produce a different power output from said power unit, of (a) registering means for registering a desired speed setting for said power unit, (b) stepping means responsive to the registration of said registering means for adjusting the speed setting on said power unit, and (c) control means responsive to the condition of said governor means effective to permit said stepping means to adjust said speed setting on the power unit from a first to a second value during the adjustment of said speed setting to the desired setting registered by said registering means only after said governor means has properly adjusted the loading on said power unit for said first speed value.

2. The combination with a throttle controlled variable speed engine equipped with a governor device effective to properly adjust the loading on said engine for each position of the throttle, of (a) throttle actuating means controlled in accordance with information concerning a desired position of said throttle effective to actuate said throttle towards said desired position, and (b) means responsive to the condition of said governor effective to permit said throttle actuating means to actuate said throttle from a first to a second position only after said engine is properly loaded for said first throttle position.

3. In a speed control system for a locomotive having a throttle controlled variable speed power unit equipped with a load regulating device for properly adjusting the loading on said power unit for each position of the throttle, the combination of, (a) registering means for registering the actual and desired speeds of said locomotive, (b) throttle stepping means responsive to the registration of said registering means effective to selectively adjust the setting of said throttle to bring the actual speed of said locomotive substantially into agreement with said desired speed, and (c) control means responsive to the condition of said load regulating device effective to permit said throttle stepping means to adjust said throttle from a first to a second setting only provided that said power unit has been properly loaded for said first throttle setting.

4. In a speed control system for a locomotive of the diesel-electric type equipped with a throttle controlled diesel engine, an electric generator driven by said engine and at least on electric traction motor thereon serving collectively as the power unit for said locomotive, said diesel engine having a speed governor associated therewith effective to maintain a substantially constant engine speed for each position of said throttle and including means for automatically regulating the generator loading on said diesel engine towards a proper value for each of said throttle positions, the combination of, (a) means for registering the actual and desired speeds of said locomotive, (b) throttle stepping means responsive to the registration of said registering means effective to selectively adjust the setting of the throttle to bring the actual speed of said locomotive substantially into agreement with said desired speed, and (c) control means responsive to the condition of said load regulating means effective to permit adjustment of the throttle by said throttle stepping means from a first to a second setting provided only that said diesel engine has been properly loaded for said first throttle setting.

5. The combination specified in claim 4 wherein said load regulating means includes a variable resistance controlled to a plurality of settings to selectively regulate the current supplied to a field winding for said generator and wherein said control means are responsive to the setting of said variable resistance.

6. In a speed control system for a locomotive of the type having a throttle control variable speed engine, an electric generator driven by said engine and at least one electric traction motor serving collectively as the power unit for said locomotive, said engine having a speed governor associated therewith effective to maintain said engine at substantially a constant speed for each setting of said throttle and including a load regulating device effective to automatically increase and decrease the generator loading on said engine and said generator output towards a proper value for each of said throttle positions by controlling the amount of current supplied to a field winding of said generator, whereby a voltage signal is developed across said field winding which varies proportionately with the actual locomotive speed for each throttle setting, the combination of, (a) an overriding device which when actuated is effective to decrease the voltage across said generator field winding and which when de-actuated permits said load regulator to vary said generator field voltage, (b) means for generating a second voltage signal proportional to the desired locomotive speed, (c) means for comparing the voltage signal developed across said generator field winding and said second voltage signal, and (d) circuit means responsive to said comparison for selectively actuating and de-actuating said overriding device in accordance with whether the actual speed of said locomotive is above or below the desired locomotive speed respectively.

7. The combination specified in claim 6 wherein said comparing means in an electromagnetic device including a pair of windings and a contact member which is opened and closed in accordance with the energization of said windings, one of said windings being energized with a current value proportional to said generator field voltage signal and the other of said windings being energized by a current value proportional to said second voltage signal, and wherein said overriding device is a solenoid and said circuit means for selectively energizing and de-energizing said overriding solenoid includes the contact member of said electromagnetic device.

8. In a speed control system for a locomotive of the type having a throttle controlled variable speed engine, an electric generator driven by said engine and at least one electric traction motor serving collectively as the power unit of said locomotive, said engine having a speed governor associated therewith effective to maintain said engine at substantially a constant speed for each setting of said throttle and including a load regulating device effective to automatically adjust the generator loading on said engine and said generator output towards a proper value for each of said throttle settings by controlling the current supplied to a field winding for said generator, the combination of, (a) an overriding solenoid which when energized is effective to decrease the current supplied to said field winding and which when deenergized permits said load regulator to vary said generator field current, (b) speed registering means responsive to the actual and desired speeds of said locomotive for registering whether the actual locomotive speed is above or below said desired locomotive speed, (c) circuit means responsive to said speed registering means alternately opened and closed for predetermined time intervals as long as the actual locomotive speed is above said desired speed, and (d) an energizing circuit for said overriding solenoid including said speed responsive circuit means when closed.

9. The combination specified in claim 8 wherein said speed responsive circuit means includes first and second relays, the energizing circuit for picking up said first relay being completed provided the actual locomotive speed is above said desired speed and said second relay is dropped away, and the energizing circuit for picking up said second relay being completed when said first relay is picked up.

10. The combination specified in claim 9 wherein the drop away times of said first and second relays are adjustable.

11. In a speed control system for a vehicle equipped with a power unit and brakes, the combination of,
(a) registering means for registering the actual and desired speeds of said vehicle,
(b) power unit control means responsive to said speed registering means effective to adjust said power unit to bring the actual vehicle speed substantially into agreement with said desired vehicle speed, and
(c) brake control means responsive to said speed registering means effective to adjust said vehicle brakes to provide a predetermined amount of braking when the desired vehicle speed is below a predetermined value, whereby said power unit control means are effective to control the vehicle power unit so as to permit said vehicle to be operated at relatively low speeds.

12. In a speed control system for a railway vehicle equipped with a throttle controlled locomotive and braking apparatus, the combination of,
(a) speed registering means for registering the actual and desired speeds of said railway vehicle,
(b) throttle control means responsive to the registration of said speed registering means effective to operate said throttle to bring the actual vehicle speed substantially into agreement with said desired speed,
(c) brake applying means responsive to the registration of said speed registering means effective to cause increasing application of said brake apparatus when the desired vehicle speed is below a predetermined value, and
(d) control means rendered effective when said brake application has increased above a predetermined value for preventing further brake application increase by said brake applying means whereby said throttle control means are effective to control said throttle so as to permit said vehicle to be operated at relatively low speed.

13. The combination specified in claim 12 further including means effective when said vehicle is desired to stop for rendering said control means ineffective to prevent said further brake application increase.

14. In a control system for an unmanned vehicle having a driving power unit thereon, the combination of,
(a) speed registering means for registering the actual and desired speeds of said vehicle,
(b) power unit control means responsive to the registration of asid registering means effective to adjust the power output of said power unit for causing said vehicle to operate at said desired speed, and
(c) trouble registering and control means responsive to the occurrence of predetermined trouble conditions in said power unit indicative that said power unit is not in proper conditon to supply full driving power for said vehicle for restricting the effectiveness of said power unit control means when said predetermined operating troubles occur, said trouble registering means being effective to cause said speed registering means to register a predetermined low desired speed if predetermined ones of said trouble conditions occur after said vehicle is underway.

15. In a control system for a moving vehicle propelled by a driving power unit, the combination of,
(a) first speed requesting means conditioned to request a first desired speed at which said vehicle should be operated,
(b) second speed requesting means responsive to the occurrence of predetermined trouble conditions aboard said vehicle indicative that said power unit is not in proper condition to supply driving power for said vehicle for requesting a second desired speed at which said vehicle should be operated,
(c) desired speed registering means responsive to said first and second speed requesting means for registering the more restrictive of said first and second requested desired speeds, and
(d) control means eeffective to control said driving power unit so as to cause said vehicle to operate in accordance with the desired speed registered by said desired speed registering means.

16. In a control system for an unmanned vehicle having a power unit thereon, the combination of,
(a) speed registering means on said vehicle effective to register the actual and desired speeds of said vehicle,
(b) trouble registering means responsive to the occurrence of predetermined trouble conditions aboard said vehicle effective only to reduce the desired speed registration of said speed registering means, and
(c) power unit control means responsive to the registration of said speed registration means effective to adjust the power output of power unit to cause substantial agreement between the actual and desired speeds of said vehicle.

17. In a vehicle control system, apparatus for selectively actuating warning devices carried at either end of a vehicle to give warning to the wayside that said vehicle is approaching a predetermined location comprising, in combination,
(a) first registering means on said vehicle for registering that said vehicle is approaching said predetermined wayside location,
(b) second registering means on said vehicle responsive to the direction of travel of said vehicle for registering which end of the vehicle is leading towards said wayside location, and
(c) circuit means responsive to said first and second registering means effective to actuate the warning device on the leading end of said vehicle.

18. The combination specified in claim 17 wherein said vehicle is required to operate below a predetermined speed when approaching said wayside location and wherein said first registering means is effective to register that said vehicle is travelling at less than said predetermined speed.

References Cited by the Examiner

UNITED STATES PATENTS

| | | | |
|---|---|---|---|
| 1,820,272 | 8/1931 | Gumpper | 246—187 |
| 1,873,698 | 8/1932 | Curas et al. | 246—174 |
| 1,925,581 | 9/1933 | Bayes | 246—169 |
| 2,235,112 | 3/1941 | Pulaski | 246—182 X |
| 2,270,413 | 1/1952 | Canetta | 246—182 |
| 2,407,521 | 9/1946 | Palley | 105—61 |
| 2,528,124 | 10/1950 | Elliott | 246—174 |
| 2,542,703 | 2/1951 | Rady et al. | 192—3 |
| 2,551,438 | 5/1951 | Johnson | 290—17 |
| 2,661,070 | 12/1953 | Ferrill | 246—182 X |
| 2,806,149 | 9/1957 | Lillquist | 105—61 X |
| 2,911,077 | 11/1959 | Carter | 192—3 |
| 2,915,623 | 12/1959 | Hughson | 246—182 |
| 3,018,367 | 1/1962 | Mountjoy | 246—182 |
| 3,218,455 | 11/1965 | Hughson | 246—187 |
| 3,218,456 | 11/1965 | Matthews | 246—187 |

OTHER REFERENCES

Railway Signaling and Communications, October 1962, published by Simmons-Boardman (N.Y.), pages 19–25.

Railway Signaling and Communications (II), November 1960, published by Simmons-Boardman (N.Y.), page 23.

ARTHUR L. LA POINT, *Primary Examiner.*

LEO QUACKENBUSH, *Examiner.*

S. B. GREEN, *Assistant Examiner.*